(12) United States Patent
Hirokubo

(10) Patent No.: US 9,910,262 B2
(45) Date of Patent: Mar. 6, 2018

(54) ACTUATOR CONTROL DEVICE, OPTICAL MODULE, ELECTRONIC APPARATUS, AND ACTUATOR CONTROL METHOD

(71) Applicant: Seiko Epson Corporation, Tokyo (JP)

(72) Inventor: Nozomu Hirokubo, Fujimi (JP)

(73) Assignee: Seiko Epson Corporation (JP)

( * ) Notice: Subject to any disclaimer, the term of this patent is extended or adjusted under 35 U.S.C. 154(b) by 125 days.

(21) Appl. No.: 14/603,902

(22) Filed: Jan. 23, 2015

(65) Prior Publication Data

US 2015/0212313 A1 Jul. 30, 2015

(30) Foreign Application Priority Data

Jan. 27, 2014 (JP) .................. 2014-012125

(51) Int. Cl.
| | |
|---|---|
| G02B 26/00 | (2006.01) |
| G02B 26/02 | (2006.01) |
| H02N 1/00 | (2006.01) |
| G05B 6/00 | (2006.01) |
| G01J 3/26 | (2006.01) |
| G05B 6/02 | (2006.01) |

(52) U.S. Cl.
CPC .............. *G02B 26/001* (2013.01); *G01J 3/26* (2013.01); *G02B 26/00* (2013.01); *G02B 26/02* (2013.01); *G05B 6/00* (2013.01); *G05B 6/02* (2013.01); *H02N 1/00* (2013.01); *H02N 1/006* (2013.01)

(58) Field of Classification Search
CPC ......... G01J 3/26; G02B 26/001; G02B 26/00; G02B 26/02; G05B 6/00; G05B 6/02; H02N 1/00; H02N 1/006

USPC ................ 359/578, 577, 484.09, 489.19
See application file for complete search history.

(56) References Cited

U.S. PATENT DOCUMENTS

| | | | |
|---|---|---|---|
| 5,142,414 A | 8/1992 | Koehler | |
| 5,751,469 A | 5/1998 | Arney et al. | |
| 5,808,781 A | 9/1998 | Arney et al. | |
| 6,084,334 A * | 7/2000 | Yamamoto ............... | H02N 2/14 310/316.01 |
| 7,212,292 B2 | 5/2007 | Van Brocklin et al. | |
| 7,265,477 B2 | 9/2007 | Wan | |

(Continued)

FOREIGN PATENT DOCUMENTS

| | | |
|---|---|---|
| CN | 101256258 A | 9/2008 |
| EP | 2 367 035 A1 | 9/2011 |

(Continued)

OTHER PUBLICATIONS

Extended Search Report for European Patent Application No. 15152295.0 dated Jun. 18, 2015 (7 pages).

(Continued)

*Primary Examiner* — William R Alexander
(74) *Attorney, Agent, or Firm* — Harness, Dickey & Pierce, P.L.C.

(57) ABSTRACT

A spectroscopic measurement apparatus includes an electrostatic actuator that is driven by applying a drive voltage, a gap detector that detects a dimension of a gap, a closed loop system that controls the drive voltage applied to the electrostatic actuator depending on a detection signal from the gap detector, and a gain setting unit that sets a gain in the closed loop system depending on drive characteristics of electrostatic actuator based on the detection signal of the gap detector.

17 Claims, 16 Drawing Sheets

(56) References Cited

U.S. PATENT DOCUMENTS

| | | | |
|---|---|---|---|
| 7,368,846 B2 | 5/2008 | Mushika et al. | |
| 7,635,939 B2 | 12/2009 | Mushika et al. | |
| 8,081,314 B2 | 12/2011 | Kamihara | |
| 2003/0034542 A1 | 2/2003 | Okumura | |
| 2003/0123125 A1 | 7/2003 | Little | |
| 2004/0100678 A1 | 5/2004 | Chang et al. | |
| 2004/0207377 A1* | 10/2004 | Shimada | H02M 3/158 323/284 |
| 2005/0281419 A1* | 12/2005 | Miyazaki | H02N 1/006 381/191 |
| 2007/0171531 A1 | 7/2007 | Nakamura | |
| 2009/0306479 A1 | 12/2009 | Kamihara | |
| 2010/0004511 A1 | 1/2010 | Kamihara | |
| 2010/0022840 A1 | 1/2010 | Yasuda | |
| 2010/0103522 A1 | 4/2010 | Matsumoto | |
| 2010/0225255 A1 | 9/2010 | Franke | |
| 2011/0222157 A1 | 9/2011 | Sano | |
| 2011/0222158 A1 | 9/2011 | Sano | |
| 2011/0228397 A1 | 9/2011 | Matsushita | |
| 2012/0200926 A1 | 8/2012 | Matsushita | |
| 2012/0206813 A1 | 8/2012 | Bahat et al. | |
| 2013/0279005 A1 | 10/2013 | Sano | |
| 2013/0308134 A1 | 11/2013 | Hirokubo | |
| 2014/0218586 A1 | 8/2014 | Sano | |
| 2015/0212313 A1 | 7/2015 | Hirokubo | |

FOREIGN PATENT DOCUMENTS

| | | |
|---|---|---|
| EP | 2 369 398 A1 | 9/2011 |
| EP | 2664947 A1 | 11/2013 |
| EP | 2687832 A1 | 1/2014 |
| JP | 59-170912 A | 9/1984 |
| JP | 01-094312 A | 4/1989 |
| JP | 07-243963 A | 9/1995 |
| JP | 09-236760 | 9/1997 |
| JP | 11-136974 A | 5/1999 |
| JP | 2002-277758 A | 9/2002 |
| JP | 2003-101138 | 4/2003 |
| JP | 2003-140064 A | 5/2003 |
| JP | 2003-215473 A | 7/2003 |
| JP | 2004-170899 A | 6/2004 |
| JP | 2004-258385 A | 9/2004 |
| JP | 2007-086517 A | 4/2007 |
| JP | 2008-183350 A | 8/2008 |
| JP | 2008-211894 A | 9/2008 |
| JP | 2011-106936 A | 6/2011 |
| JP | 2011-191492 A | 9/2011 |
| JP | 2011-191554 A | 9/2011 |
| JP | 2012-163664 | 8/2012 |
| JP | 2012-168362 | 9/2012 |
| JP | 2012-198268 | 10/2012 |
| JP | 2013-072930 A | 4/2013 |
| JP | 2013-088601 A | 5/2013 |
| JP | 2013-218194 A | 10/2013 |
| JP | 2013-222122 A | 10/2013 |
| JP | 2013-238755 A | 11/2013 |
| JP | 2014-059497 A | 4/2014 |
| WO | WO-02-086582 A1 | 10/2002 |
| WO | WO-2004-041710 | 5/2004 |

OTHER PUBLICATIONS

Extended European Search Report for Application No. EP 13 16 7619 dated Aug. 20, 2013 (11 pages).

Extended European Search Report for Application No. EP 14 15 3779 dated May 6, 2014 (5 pages).

* cited by examiner

ACTUATOR CONTROL DEVICE, OPTICAL MODULE, ELECTRONIC APPARATUS, AND ACTUATOR CONTROL METHOD

BACKGROUND

1. Technical Field

The present invention relates to an actuator control device, an optical module, an electronic apparatus, and an actuator control method.

2. Related Art

In the related art, a variable wavelength interference filter including a pair of substrates facing each other, reflective films respectively disposed in each substrate and facing each other, and electrodes respectively disposed in each substrate and facing each other is known (for example, JP-A-1-94312).

In the variable wavelength interference filter described in JP-A-1-94312, electrostatic capacitance monitor electrodes facing each other and electrostatic force applying electrodes (electrostatic actuator) facing each other are respectively disposed in each substrate. In such a variable wavelength interference filter, a voltage is applied to the electrostatic actuator by a control circuit and thereby a gap amount (interval dimensions) between reflective films is changed. In addition, a potential of the electrostatic capacitance monitor electrode is detected by an electrostatic capacitance detection circuit and the voltage applied from the control circuit to the electrostatic actuator is finely adjusted (feedback control) based on detected electrostatic capacitance, and thereby the gap amount of the gap between the reflective films can be set to a desired target value.

However, in the electrostatic actuator described in JP-A-1-94312, a drive amount when applying a predetermined drive voltage may be changed (drive characteristics are changed) by environmental factors such as a temperature change or a temporal change, and the like. For example, if an initial gap of the electrostatic actuator is changed, since the drive amount when applying the voltage is changed, the drive characteristics are also changed. As described above, if the drive characteristics are changed, it is necessary to perform gain control for resetting an appropriate gain also in the drive circuit of the electrostatic actuator.

However, in the feedback control using a fixed gain of the related art described in JP-A-1-94312, there is a problem that appropriate gain control cannot be performed and an optimal feedback control is unlikely to be performed, and for example, a time for setting the electrostatic actuator to the target value is long or abnormal oscillation occurs.

SUMMARY

An advantage of some aspects of the invention is to provide an actuator control device capable of optimal feedback control even if drive characteristics are changed, an optical module, an electronic apparatus, and an actuator control method.

An actuator control device of the invention includes an actuator that is driven by applying a drive voltage; a detection unit that detects a drive amount of the actuator; a feedback loop that controls the drive voltage applied to the actuator depending on the drive amount detected by the detection unit; and a gain setting unit that sets a gain in the feedback loop depending on drive characteristics of the actuator based on the drive amount detected by the detection unit.

In this case, the drive characteristics of the actuator are determined based on the drive amount of the actuator detected by the detection unit and the gain of the feedback loop is set depending on the drive characteristics. That is, even if the drive characteristics of the actuator are changed by an environmental change or a temporal change, the gain of the feedback loop is reset based on determined drive characteristic. Thus, it is possible to drive the actuator by an optimal gain depending on the changed drive characteristics. Therefore, a defect such as abnormal oscillation due to an inappropriate gain or a long time for setting the drive amount of the actuator to a target drive amount is suppressed and it is possible to perform optimal feedback control of the actuator.

It is preferable that the actuator control device of the invention further include a first member; and a second member facing the first member, the actuator be an electrostatic actuator including a first electrode provided in the first member and a second electrode provided in the second member and facing the first electrode, and the detection unit detect a gap dimension between the first member and the second member as the drive amount.

In this case, the actuator is the electrostatic actuator including the first electrode and the second electrode facing each other and changes the gap dimension between the first member and the second member by applying the drive voltage between the electrodes. In such an electrostatic actuator, since the gap dimension between the first member and the second member is non-linearly changed with respect to the drive voltage, if the drive characteristics are changed by the environmental change or the temporal change described above, optimal feedback control cannot be performed in the fixed gain. In contrast, in the invention, even if the drive characteristics of the actuator are changed, it is possible to perform the optimal feedback control by setting the optimal gain and it is possible to quickly set the gap between the first member and the second member to a desired dimension similar to the invention described above.

It is preferable that the gain setting unit set the gain based on the drive amount in an initial state in which the drive voltage is not applied to the actuator.

Moreover, as described above, if the actuator is the electrostatic actuator and the gap dimension between the first member and the second member is the detected drive amount, it is possible to make the initial gap dimension between the first member and the second member be the initial drive amount.

If the drive characteristics (curve indicating the drive amount with respect to the drive voltage) to the actuator are substantially the same shape and the drive amount can be measured in the initial state, it is possible to predict the drive characteristics. Thus, in this case, it is possible to easily determine the drive characteristics of the actuator by detecting the drive amount by the detection unit in the initial state described above and to easily set the gain in the feedback loop from the drive characteristics.

It is preferable that the gain setting unit obtain a plurality of combinations of the drive voltage applied to the actuator and the drive amount detected by the detection unit when applying the drive voltage and set the gain based on the combinations.

In this case, the plurality of combinations (measuring points) of the drive voltage applied to the actuator and the drive amount when applying the drive voltage are obtained. In this case, it is possible to obtain the drive characteristics of the actuator accurately even if the drive characteristics of the actuator are changed based on a plurality of causes.

Thus, it is possible to set a more appropriate gain to a change in the drive characteristics to the actuator by resetting the gain based on the drive characteristics.

It is preferable that the feedback loop have a controller that controls the drive voltage applied to the actuator based on the drive amount detected by the detection unit and a target value of the drive amount of the actuator, and the gain setting unit set the gain of the controller.

In this case, the gain of the controller applying a feedback voltage to the actuator is set in the feedback loop. Adjustment of sensitivity is appropriately performed by changing the gain of the controller depending on the drive characteristics in feedback control and it is possible to appropriately maintain a control state.

It is preferable that the actuator have a first actuator and a second actuator capable of respectively being independently driven, the feedback loop include a bias voltage applying unit that applies a predetermined bias voltage to the first actuator and a controller that controls the drive voltage applied to the second actuator based on the drive amount detected by the detection unit and the target value of the drive amount of the actuator, and the gain setting unit set a bias voltage in the bias voltage applying unit.

In this case, the actuator is configured of the first actuator and the second actuator, and the bias voltage is applied to the first actuator and the feedback voltage is applied to the second actuator. In such an actuator, it is possible to accurately control the drive amount of the actuator by driving the first actuator to perform rough movement by applying the bias voltage and driving the second actuator to perform fine movement by the feedback voltage based on the drive amount detected by the detection unit.

At this time, if the gain is changed by a feedback voltage applying unit controlling the second actuator that is driven to perform the fine movement and for example, the sensitivity is increased, it is difficult to perform the feedback control. In contrast, in the invention, the bias voltage is reset in the bias voltage applying unit. As described above, the sensitivity of the second actuator is changed by resetting the bias voltage and, as a result, it is possible to set the gain of an entire feedback loop to be an optimal value. Furthermore, in this case, it is possible to constantly maintain the sensitivity in the feedback applying unit and to perform the optimal feedback control.

An optical module of the invention includes: a pair of reflective films facing each other; an actuator that changes a gap dimension between the pair of reflective films by applying a drive voltage; a detection unit that detects the gap dimension between the pair of reflective films; a feedback loop that controls the drive voltage applied to the actuator depending on the gap dimension detected by the detection unit; and a gain setting unit that sets a gain in the feedback loop depending on drive characteristics of the actuator based on the gap dimension detected by the detection unit.

In this case, the pair of reflective films facing each other are included and the gap dimension between reflective films can be changed by the actuator. That is, the optical module of the invention performs the feedback control on variable wavelength type Fabry-Perot etalon by driving the actuator.

In such an optical module, the gap dimension between the reflective films is detected by the detection unit and feedback control is performed on the actuator based on a detection result, and thereby it is possible to accurately emit light having a desired wavelength from the Fabry-Perot etalon.

At this time, similar to the invention described above, even if the drive characteristics of the actuator are changed, since the gain of the feedback loop can be set to the optimal value, the gap dimension between the reflective films is matched to a desired value by the feedback control and it is possible to emit the light having a desired wavelength from the variable wavelength type Fabry-Perot etalon.

An electronic apparatus of the invention includes: an actuator that is driven by applying a drive voltage; a detection unit that detects a drive amount of the actuator; a feedback loop that controls the drive voltage applied to the actuator depending on the drive amount detected by the detection unit; a gain setting unit that sets a gain in the feedback loop depending on drive characteristics of the actuator based on the drive amount detected by the detection unit, and a processing section that performs a predetermined process by driving of the actuator.

In this case, as described above, it is possible to perform the optimal feedback control of the actuator, to suppress the abnormal oscillation, and to quickly drive the actuator by a desired target drive amount. Thus, it is possible to quickly start the process in the processing section of the electronic apparatus and to improve process accuracy.

An actuator control method of the invention is an actuator control method of an actuator control device including an actuator that is driven by applying a drive voltage, a detection unit that detects a drive amount of the actuator, and a feedback loop that controls the drive voltage applied to the actuator depending on the drive amount detected by the detection unit, the actuator control method including: obtaining drive characteristics of the actuator based on the drive amount detected by the detection unit; setting a gain in the feedback loop based on the obtained drive characteristics; and applying the drive voltage to the actuator by the gain that is set.

In this case, similar to the invention described above, even if the drive characteristics of the actuator are changed by the environmental change or the temporal change, it is possible to drive the actuator by the optimal gain depending on the changed drive characteristics. Thus, the defect such as abnormal oscillation due to an inappropriate gain or a long time for setting the drive amount of the actuator to a target value is suppressed and it is possible to perform optimal feedback control of the actuator.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a spectroscopic measurement apparatus of a first embodiment according to the invention will be described with reference to the drawings.
Configuration of Spectroscopic Measurement Apparatus FIG. 1 is a block diagram illustrating a schematic configuration of a spectroscopic measurement apparatus of a first embodiment according to the invention.

A spectroscopic measurement apparatus 1 is an electronic apparatus of the invention and is an apparatus that analyzes light intensity of a predetermined wavelength in measurement object light reflected on a measurement object X and measures spectral spectrum. Moreover, in the embodiment, an example in which the measurement object light reflected on the measurement object X is measured is described, but as the measurement object X, for example, if a light emitter such as a liquid crystal display is used, the light emitted from the light emitter may be a light that is measurement object.

Figure 1:
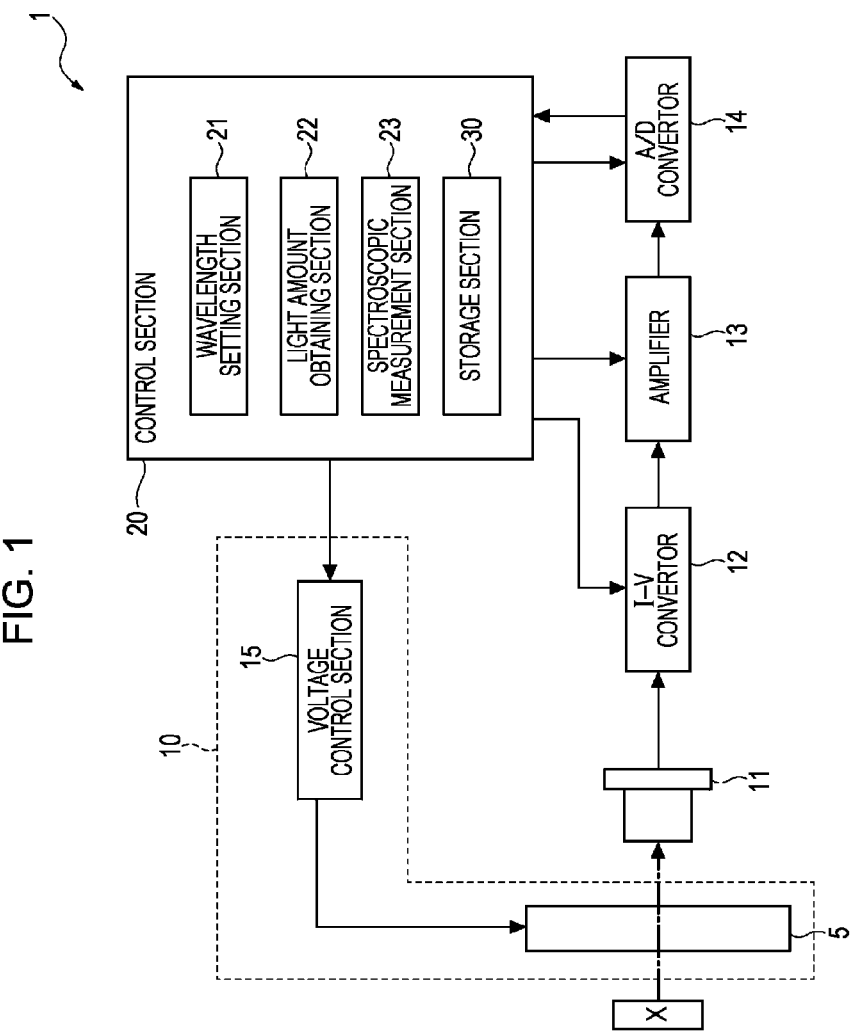
FIG. 1 is a block diagram illustrating a schematic configuration of a spectroscopic measurement apparatus of a first embodiment according to the invention.

As illustrated in FIG. 1, the spectroscopic measurement apparatus 1 includes an optical module 10, a detector 11 (detection section), an I-V convertor 12, an amplifier 13, an A/D convertor 14, and a control section 20. Furthermore, the optical module 10 is configured by including a variable wavelength interference filter 5 and a voltage control section 15.

The detector 11 receives light transmitted through the variable wavelength interference filter 5 of the optical module 10 and outputs a detection signal (current) corresponding to light intensity of the received light.

The I-V convertor 12 converts the detection signal input from the detector 11 into a voltage value and outputs the voltage value to the amplifier 13.

The amplifier 13 amplifies the voltage (detection voltage) corresponding to the detection signal input from the I-V convertor 12.

The A/D convertor 14 converts the detection voltage (analog signal) input from the amplifier 13 into a digital signal and outputs the digital signal to the control section 20.

The voltage control section 15 drives the variable wavelength interference filter 5 based on control of the control section 20 and transmits light having a predetermined target wavelength from the variable wavelength interference filter 5.
Configuration of Optical Module Next, a configuration of the optical module 10 will be described.

Figure 2:
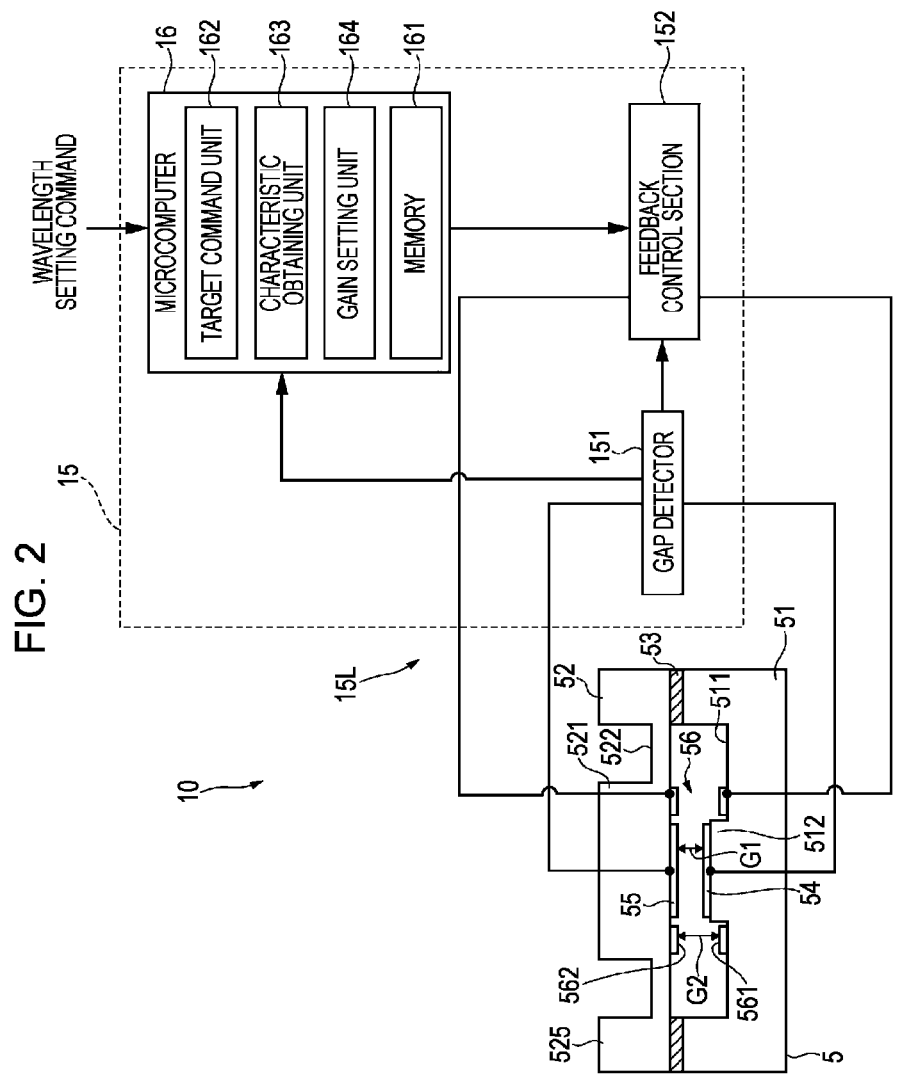
FIG. 2 is a diagram illustrating a schematic configuration of an optical module of the first embodiment.

FIG. 2 is a block diagram illustrating a schematic configuration of the optical module 10.

Figure 3:
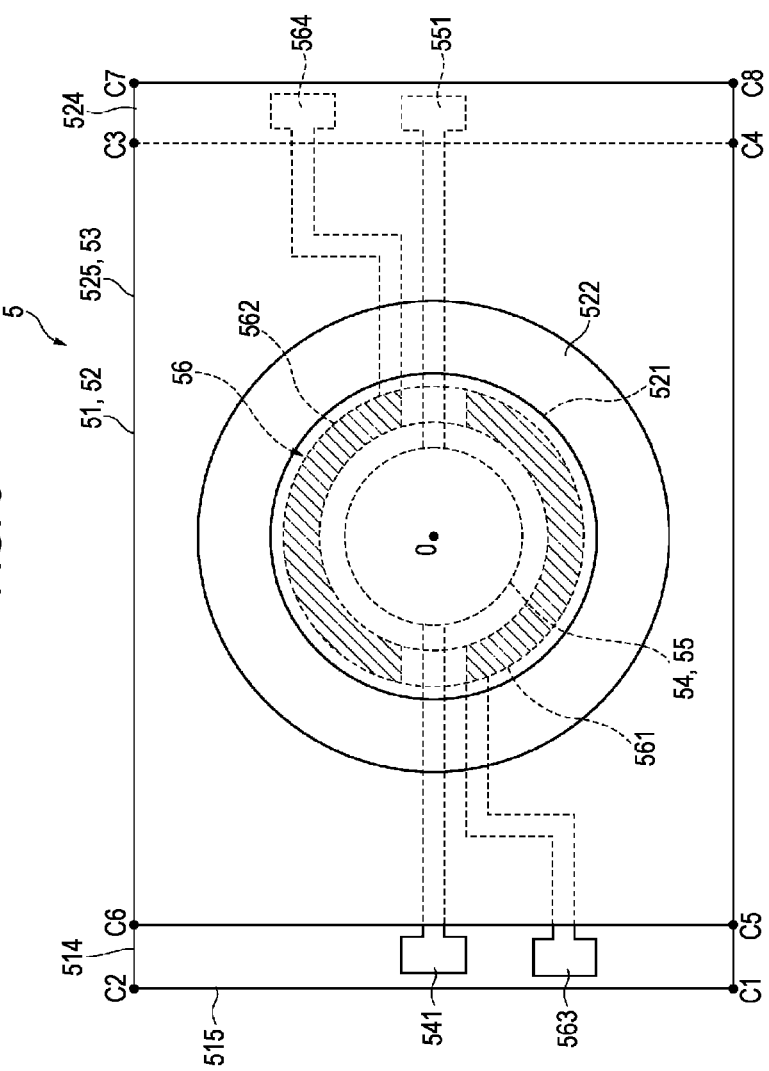
FIG. 3 is a plan view of a variable wavelength interference filter of the first embodiment.

As described above, the optical module 10 is configured by including the variable wavelength interference filter 5 and the voltage control section 15.
Configuration of Variable Wavelength Interference Filter Hereinafter, the variable wavelength interference filter 5 of the optical module 10 will be described. FIG. 3 is a plan diagram of a schematic configuration of the variable wavelength interference filter 5.

As illustrated in FIGS. 2 and 3, for example, the variable wavelength interference filter 5 is a rectangular plate-shaped optical member and includes a fixed substrate (first member) and a movable substrate 52 (second member). For example, the fixed substrate 51 and the movable substrate 52 are formed of an insulating material such as various types of glass and crystal and, for example, are integrally configured by bonding by a bonding film 53 (see FIG. 2) configured of a plasma polymerization film composed mainly of siloxane.

The fixed substrate 51 is provided with a fixed reflective film 54 configuring one side of a pair of reflective films of the invention and the movable substrate 52 is provided with a movable reflective film 55 configuring the other side of the pair of reflective films of the invention. The fixed reflective film 54 and the movable reflective film 55 are disposed to face each other through a gap G1 (see FIG. 2).

Furthermore, the fixed substrate 51 is provided with a fixed electrode 561 and the movable substrate 52 is provided with a movable electrode 562. The fixed electrode 561 and the movable electrode 562 are disposed to face each other through a predetermined gap. The fixed electrode 561 and the movable electrode 562 configure an electrostatic actuator 56 that is an example of the actuator of the invention.

Moreover, in the following description, a plan diagram diagramed from a thickness direction of substrates of the fixed substrate 51 and the movable substrate 52, that is, a plan diagram in which the variable wavelength interference filter 5 is diagramed from a lamination direction of the fixed substrate 51, the bonding film 53, and the movable substrate 52, is referred to as a plan diagram of a filter. Moreover, in the embodiment, in a plan diagram of the filter, a center point of the fixed reflective film 54 and a center point of the movable reflective film 55 coincide and the center point of the reflective films in a plan diagram is referred to as a filter center point O and a line passing through the center point of the reflective films is referred to as a center axis.
Configuration of Fixed Substrate As illustrated in FIG. 2, for example, the fixed substrate 51 includes an electrode arrangement groove 511 and a reflective film installation section 512 formed by etching and the like. Furthermore, one end side (side C1-C2 in FIG. 3) of the fixed substrate 51 is protruded further to the outside than a substrate edge (side C5-C6 in FIG. 3) of the movable substrate 52 and configures a first terminal taking-out section 514.

The electrode arrangement groove 511 is formed in an annular shape which is centered on the filter center point O of the fixed substrate 51 in a plan diagram of the filter. The reflective film installation section 512 is formed so as to protrude from the center portion of the electrode arrangement groove 511 to the movable substrate 52 in a plan diagram of the filter. The fixed electrode 561 of the electrostatic actuator 56 is provided on a groove bottom surface of the electrode arrangement groove 511.

Furthermore, the fixed reflective film 54 is provided on a protruding leading end surface of the reflective film installation section 512.

Furthermore, the fixed substrate 51 is provided with an electrode lead-out groove (not illustrated) extending from the electrode arrangement groove 511 to an outer periphery of the fixed substrate 51.

For example, the fixed electrode 561 is formed in an arc shape (substantially C-shape) and as illustrated in FIG. 3, a C-shaped opening is provided in a part that is close to the side C1-C2. Furthermore, an insulation film may be laminated on the fixed electrode 561 to ensure insulation between the fixed electrode 561 and the movable electrode 562.

Then, the fixed electrode 561 includes a fixed lead-out electrode 563 extending to the first terminal taking-out section 514 along the electrode lead-out groove. For example, an extending leading end portion of the fixed lead-out electrode 563 is connected to the voltage control section 15 by flexible printed circuits (FPC) or a lead wire, and the like.

For example, the fixed reflective film 54 provided on the protruding leading end surface of the reflective film installation section 512 is configured of a reflective film material having conductivity such as a metal film of Ag and the like, or an Ag alloy. Moreover, for example, as the fixed reflective film 54, a dielectric multilayer film in which a high refractive layer is $TiO_2$ and a low refractive layer is $SiO_2$ may be used. If the dielectric multilayer film is used as the fixed reflective film 54, the conductivity is maintained by laminating the conductive film on the lowermost layer and the uppermost layer (surface layer) of the dielectric multilayer film. As the conductive film, for example, a reflective film such as the Ag alloy having high reflectance characteristics for a wide wavelength range may be used. In this case, it is possible to widen a measurement object wavelength range of the variable wavelength interference filter 5 by the conductive film, to take out a desired target wavelength for the wide wavelength range, and to take out the light of the target wavelength with high resolution by the dielectric multilayer film. Furthermore, in order to improve adhesion between the conductive film and the reflective film installation section 512 or between the conductive film and the dielectric multilayer film, a transparent adhesive layer may be further disposed.

Then, as illustrated in FIG. 3, the fixed substrate is provided with a first mirror electrode 541 that is connected to the outer periphery of the fixed reflective film 54 and extends to the first terminal taking-out section 514 through the C-shape opening of the fixed electrode 561. The first mirror electrode 541 is formed by being deposited at the same time as the formation of the fixed reflective film 54.

Then, the first mirror electrode 541 is connected to the voltage control section 15 on the first terminal taking-out section 514.

A region in which the electrode arrangement groove 511, the reflective film installation section 512, and the electrode lead-out groove of the fixed substrate 51 are not formed is bonded to the movable substrate 52 by the bonding film 53.

Configuration of Movable Substrate

The movable substrate 52 includes a movable section 521 that has an annular shape which is centered on the filter center point in a plan diagram of the filter as illustrated in FIG. 3, a holding section 522 that is coaxial with the movable section 521 and holds the movable section 521, and a substrate outer periphery section 525 that is provided on the outside of the holding section 522.

Furthermore, as illustrated in FIG. 3, the movable substrate 52 is configured of a second terminal taking-out section 524 of which one end side (side C7-C8 in FIG. 3) is protruded further to the outside than the substrate edge (side C3-C4 in FIG. 3) of the fixed substrate 51.

The movable section 521 is formed such that a thickness dimension thereof is greater than that of the holding section 522 and, for example, in the embodiment, the thickness dimension is the same as a thickness dimension of the movable substrate 52. The movable section 521 is formed such that a diameter dimension thereof is greater than at least that of the outer periphery of the reflective film installation section 512 in a plan view of the filter. Then, the movable reflective film 55 and the movable electrode 562 are provided on a movable surface of the movable section 521 facing the fixed substrate 51.

The movable electrode 562 is provided on the outer periphery side of the movable reflective film 55 in a plan view of the filter and is disposed facing the fixed electrode 561 through a gap. The movable electrode 562 is formed having an arc shape (substantially C-shape) and, as illustrated in FIG. 3, the C-shape opening is provided in a part that is close to the side C7-C8. Furthermore, similar to the fixed electrode 561, an insulation film may be laminated on the movable electrode 562.

Here, as illustrated in FIG. 3, the electrostatic actuator 56 is configured of an arc region (region indicated by upward-sloping hatched portions in FIG. 3) in which the movable electrode 562 and the fixed electrode 561 overlap in a plan view of the filter. As illustrated in FIG. 3, the electrostatic actuator 56 is formed and disposed to be point-symmetric with respect to the filter center point O in a plan view of the filter. Thus, an electrostatic attracting force generated when applying the voltage to the electrostatic actuator 56 also acts on a position that is to be point-symmetric with respect to the filter center point O and can displace the movable section 521 on the fixed substrate 51 side with good balance.

Furthermore, as illustrated in FIG. 3, the movable electrode 562 is provided with a movable lead-out electrode 564 extending to the second terminal taking-out section 524. The movable lead-out electrode 564 is disposed along a position facing the electrode lead-out groove provided in the fixed substrate 51. Furthermore, for example, an extending leading end portion of the movable lead-out electrode 564 is connected to the voltage control section 15 by the FPC or the lead wire and the like.

The movable reflective film 55 is provided in the center portion of the movable section 521 by facing the fixed reflective film 54 through the gap G1 between the reflective films. For the movable reflective film 55, a reflective film having the same configuration as that of the fixed reflective film 54 described above is used. Moreover, in the embodiment, the gap G1 between the reflective films 54 and 55 is smaller than a gap between the electrodes 561 and 562.

Furthermore, as illustrated in FIG. 3, the movable substrate 52 is provided with a second mirror electrode 551 that is connected to the outer periphery of the movable reflective film 55, passes through the C-shape opening of the movable electrode 562, and extends to the second terminal taking-out section 524.

Furthermore, if the movable reflective film 55 is configured of a laminated body of the dielectric multilayer film and the conductive film, the second mirror electrode 551 is formed at the same time as formation of conductive film and is connected to the conductive film.

Then, for example, the second mirror electrode 551 is connected to the voltage control section 15 by the FPC or the lead wire and the like on the second terminal taking-out section 524.

Moreover, in the embodiment, as illustrated in FIG. 3, an example in which a gap G2 between the electrodes 561 and 562 is greater than the gap G1 is illustrated but the invention is not limited to the example. For example, if infrared light is an object as the measurement object light, the gap G1 may be greater than the gap G2 between the electrodes 561 and 562 depending on a measurement object wavelength range.

The holding section 522 is a diaphragm surrounding a periphery of the movable section 521 and of which a thickness dimension is smaller than that of the movable section 521. Such a holding section 522 is easily bent more than the movable section 521 and can displace the movable section 521 to the fixed substrate 51 side. At this time, since the thickness dimension of the movable section 521 greater than that of the holding section 522 and rigidity is increased, even if the holding section 522 is pulled toward the fixed substrate 51 side by the electrostatic attracting force, a change in a shape of the movable section 521 is suppressed. Thus, bending of the movable reflective film 55 provided in the movable section 521 is unlikely to occur and it is possible to always maintain the fixed reflective film 54 and the movable reflective film 55 in a parallel state.

Moreover, in the embodiment, the diaphragm-shaped the holding section 522 is exemplified, but the invention is not limited to the embodiment and, for example, a configuration in which beam-shaped holding sections arranged at equal angular intervals centered on the filter center point O are provided may be included.

As described above, the substrate outer periphery section 525 is provided on the outside of the holding section 522 in a plan diagram of the filter. A surface of the substrate outer periphery section 525 facing the fixed substrate 51 is bonded to the fixed substrate 51 through the bonding film 53.

Configuration of Voltage Control Section

As illustrated in FIG. 2, the voltage control section 15 is configured by including a gap detector 151 (detection unit in the invention), a feedback control section 152, and a microcomputer (micro-controller) 16.

Figure 4:
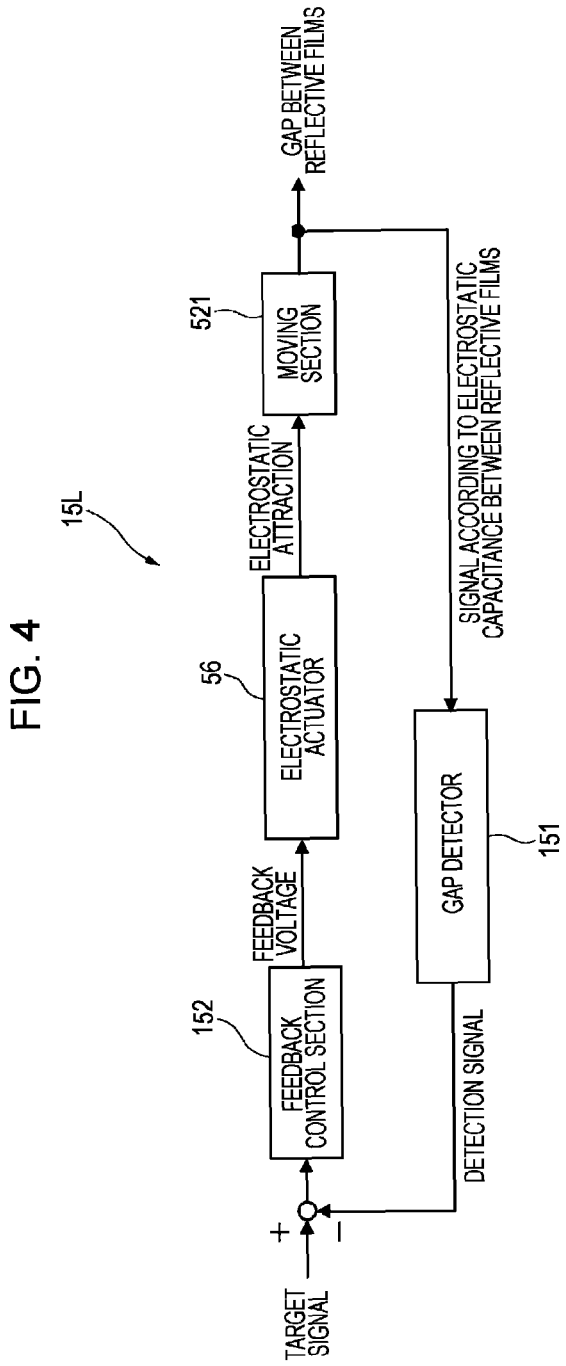
FIG. 4 is a conceptual diagram of a closed loop system in a voltage control section of the first embodiment.

FIG. 4 is a conceptual diagram of a closed loop system using the voltage control section 15.

As illustrated in FIG. 4, the voltage control section 15 configures a closed loop system 15L (feedback loop) by the electrostatic actuator 56 of the variable wavelength interference filter 5, the gap detector 151, and the feedback control section 152. Then, in the embodiment, the microcomputer 16 appropriately maintains a control state when performing the feedback control by setting the gain of the closed loop system 15L based on the drive characteristics of the electrostatic actuator 56.

Hereinafter, a configuration of the voltage control section 15 will be described in detail.

The gap detector 151 is connected to the first mirror electrode 541 and the second mirror electrode 551 of the variable wavelength interference filter 5. The gap detector 151 detects the dimension of the gap G1 between the reflective films 54 and 55, which is varied by the drive of the electrostatic actuator 56 and outputs a detection signal. Here, it is possible to easily calculate a drive amount of the electrostatic actuator 56 by detecting the gap dimension of the gap G1 and the gap detector 151 functions as the detection unit of the invention.

Specifically, the gap detector 151 has a C-V converting circuit and converts an electrostatic capacitance between the reflective films 54 and 55 to a voltage value (detection signal). As the C-V converting circuit, a switch-capacitor circuit may be exemplified.

Then, the gap detector 151 outputs the detection signal to the feedback control section 152 and the microcomputer 16.

Moreover, the gap detector 151 may output an analog signal or a digital signal as the detection signal. If the digital signal is output, the detection signal (analog signal) from the C-V converting circuit is input into an Analog to Digital Converter (ADC) and the analog signal is converted to the digital signal.

The feedback control section 152 corresponds to the controller of the invention and is connected to the fixed lead-out electrode 563 and the movable lead-out electrode 564 of the variable wavelength interference filter 5. Then, the feedback control section 152 applies the drive voltage to the electrostatic actuator 56 based on a command signal indicating that the gap G1 input from the microcomputer is set to be a predetermined target value.

Furthermore, the feedback control section 152 performs control by increasing and decreasing the drive voltage with respect to the electrostatic actuator 56 such that a deviation between the detection signal from the gap detector 151 and the command signal input from the microcomputer 16 is a predetermined threshold or less. That is, the feedback control section 152 performs the feedback control based on the detection signal and the command signal.

Furthermore, the feedback control section 152 can vary the gain by the control of the microcomputer 16. The gain of an entire closed loop system is adjusted by varying the gain of the feedback control section 152.

Specifically, as the feedback control section 152, if an analog type controller is used, a gain setting circuit capable of setting any one of a plurality of gains is provided in the controller. Then, the gain of the gain setting circuit is set to a predetermined gain by a control signal from the microcomputer 16.

Furthermore, as the feedback control section 152, if a digital type controller is used, the gain can be set to a predetermined gain by rewriting a parameter (register value) of a control gain based on the signal of the microcomputer.

The microcomputer 16 includes a memory 161 and, for example, stores a relationship (gap correlated data) between the detection signal (voltage signal) detected by the gap detector 151 and the dimension of the gap G1. Moreover, as the gap correlated data, the dimension of the gap G2 for the detection signal may be stored.

Furthermore, drive characteristic data of the electrostatic actuator 56 indicating the dimension of the gap G2 (actuator gap) for the drive voltage applied to the electrostatic actuator 56 is recorded in the memory 161. Furthermore, an optimal gain for each drive characteristic data is stored by correlating to each drive characteristic data.

Figure 5:
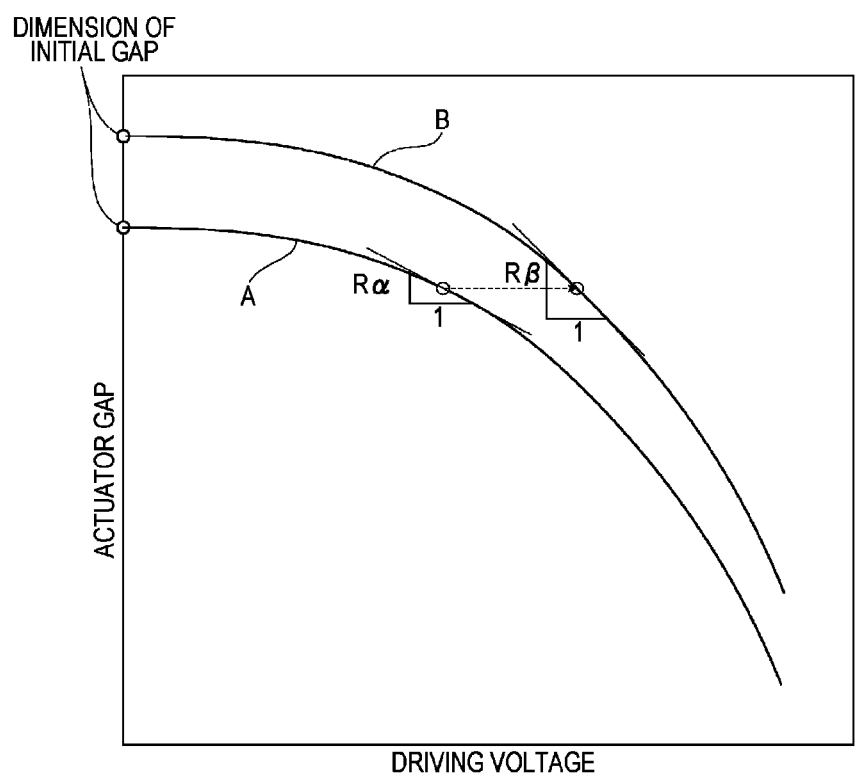
FIG. 5 is a diagram illustrating an example of drive characteristic data of an electrostatic actuator.

FIG. 5 is a diagram illustrating an example of drive characteristic data.

As illustrated in FIG. 5, in the embodiment, a plurality of drive characteristic data are recorded, in which the dimensions (initial gap dimension) of the gap G2 in the initial state in which the drive voltage is not applied to the electrostatic actuator 56 are respectively different.

Furthermore, as illustrated in FIG. 2, the microcomputer 16 functions as a target command unit 162, a characteristic obtaining unit 163, and a gain setting unit 164.

When a wavelength setting command is input from the control section 20, the target command unit 162 calculates the dimension (target value) of the gap G1 corresponding to the target wavelength and outputs the dimension to the feedback control section 152 as a target signal.

The characteristic obtaining unit 163 obtains the drive characteristics of the electrostatic actuator 56 based on the detection signal input from the gap detector 151.

The gain setting unit 164 sets the gain of the feedback control section 152 based on the drive characteristics obtained by the characteristic obtaining unit 163.

Configuration of Control Section

Returning to FIG. 1, the control section 20 of the spectroscopic measurement apparatus 1 will be described.

The control section 20 corresponds to a processing section of the invention, is, for example, configured by combining a CPU or memory, and the like, and controls an entire operation of the spectroscopic measurement apparatus 1. As illustrated in FIG. 1, the control section 20 includes a wavelength setting section 21, a light amount obtaining section 22, a spectroscopic measurement section 23, and a storage section 30.

Various programs or various data (for example, V-X, data indicating the drive voltage for the target wavelength and the like) for controlling the spectroscopic measurement apparatus 1 are recorded in the storage section 30.

The wavelength setting section 21 sets the target wavelength of the light taken out by the variable wavelength interference filter 5 and outputs the control signal indicating that the set target wavelength is taken out from the variable wavelength interference filter 5 to the voltage control section 15.

The light amount obtaining section 22 obtains a light amount of the target wavelength transmitting the variable wavelength interference filter 5 based on the light amount obtained by the detector 11.

The spectroscopic measurement section 23 measures spectral characteristics of the measurement object light based on the light amount obtained by the light amount obtaining section 22.

Driving Method of Variable Wavelength Interference Filter

Figure 6:
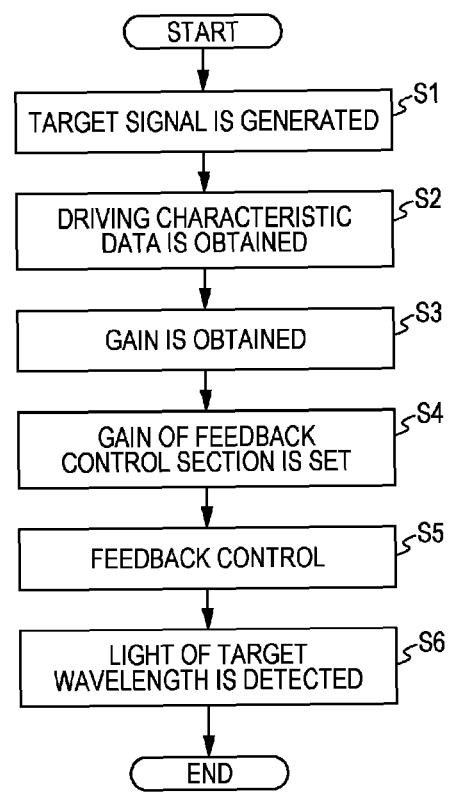
FIG. 6 is a flowchart illustrating a driving method (control method of an actuator) of the variable wavelength interference filter of the first embodiment.

FIG. 6 is a flowchart illustrating a driving method (control method of the actuator) of the variable wavelength interference filter in a spectroscopic measurement process of the spectroscopic measurement apparatus 1.

In order to obtain a light intensity of each wavelength included in the measurement object light by the spectroscopic measurement apparatus 1, first, the control section 20 sets the wavelength (target wavelength) of the light transmitting the variable wavelength interference filter 5 by the wavelength setting section 21. Then, the wavelength setting section 21 outputs the wavelength setting command of indicating that the light of the set target wavelength is transmitted to the voltage control section 15 (step S1).

Next, the characteristic obtaining unit 163 of the microcomputer 16 obtains the drive characteristic data of the electrostatic actuator 56 based on the detection signal input from the gap detector 151 in the initial state (step S2).

Specifically, the characteristic obtaining unit 163 obtains an initial gap dimension of the gap G1 between the reflective films 54 and 55 based on the detection signal input from the gap detector 151 and calculates the initial value (initial gap dimension) of the gap G2 between the electrodes 561 and 562 from the initial value of the gap G1. Then, the characteristic obtaining unit 163 obtains the drive characteristic data corresponding to the initial gap dimension of the calculated gap G2 from a plurality of drive characteristic data stored in the memory.

Next, the gain setting unit 164 obtains the optimal gain for the obtained drive characteristic data (step S3).

In the embodiment, the optimal gain correlated to each drive characteristic data is read.

Moreover, an example in which the gain correlated to the drive characteristic data is illustrated, but, for example, table data indicating a relationship of the gain with respect to the initial gap dimension of the gap G2 may be stored in the memory 161.

Furthermore, if a reference gain with respect to the drive characteristic data (reference characteristic data) that is the reference is set, the gain setting unit 164 may perform a process that calculates the gain based on the drive characteristic data obtained in step S2 and the reference characteristic data.

For example, in FIG. 5, if a reference gain Gc is set with respect to the recording device in the drive characteristic data of a curve A and the drive characteristic data of a curve B is obtained in step S2, the gain setting unit 164 calculates a sensitivity ratio of each drive characteristic data.

For example, in the recording data of the curve A, when the actuator gap G2 is set to Gα, the sensitivity in the feedback control is Rα (m/V) and the drive characteristic is changed to the curve B and the sensitivity in the feedback control when setting the gap G2 to GU is changed to Rβ (m/V). In this case, the gain setting unit 164 sets the gain of (Rβ/Ra) times the reference gain Gc. Thus, a sensitivity change in the feedback control is suppressed and it is possible to suppress a defect such as an increase in a setting time to the target value.

Thereafter, the gain setting unit 164 outputs the control signal of indicating that the gain obtained in step S3 is set to the feedback control section 152 and sets the gain (step S4).

Thereafter, the target command unit 162 outputs the target signal indicating the target value of the gap G2 of the electrostatic actuator 56 to the feedback control section 152 based on the target wavelength including in the wavelength setting command input in step S1. Thus, the feedback control section 152 performs the feedback control (step S5).

That is, the feedback control section 152 controls the drive voltage applied to the electrostatic actuator 56 such that the deviation between the detection signal input from the gap detector 151 and the target signal approaches 0.

In step S5, the dimension of the gap G1 of the variable wavelength interference filter 5 becomes a dimension corresponding to the target wavelength set in step S1 and the light centering on the target wavelength is emitted from the variable wavelength interference filter 5. Thus, the light of the target wavelength is received in the detector 11 and the light amount obtaining section 22 of the control section 20 obtains the light amount of the light of the target wavelength based on a light amount detection signal input from the detector 11 (step S6).

Operational Effects of First Embodiment

In the embodiment, the characteristic obtaining unit 163 measures the drive characteristics of the electrostatic actuator 56 based on the detection signal from the gap detector 151 and the gain setting unit 164 set the gain in the feedback control corresponding to the measured drive characteristics.

Thus, even if the drive characteristics of the electrostatic actuator 56 are varied, for example, by the environmental change or the temporal change, it is possible to set the optimal gain corresponding to the varied drive characteristics. Thus, in the feedback control, it is possible to avoid a defect that the electrostatic actuator is abnormally oscillated or excessive time is required for output of the light of the target wavelength and it is possible to perform the optimal feedback control.

It is also possible to more quickly obtain the light amount of the light of the target wavelength in the optical module 10 and it is possible to further quickly perform the spectroscopic measurement process in the spectroscopic measurement apparatus 1 by performing the optimal feedback control.

In the embodiment, the characteristic obtaining unit 163 obtains the initial gap dimension of the gap G2 in the initial state in which the drive voltage is not applied to the electrostatic actuator 56 and reads the drive characteristic data corresponding to the initial gap dimension.

In a case where a spring coefficient of the holding section 522 of the variable wavelength interference filter 5 is considered to be constant, it is possible to predict behavioral characteristics from the initial gap dimension of the gap G2. Furthermore, as in the embodiment, it is possible to further quickly obtain the drive characteristic data for the initial gap dimension by storing a plurality of drive characteristic data in the memory 161 in advance. Thus, it is possible to further quickly set the gain and to further quickly start the feedback control.

Second Embodiment

Next, a second embodiment of the invention will be described with reference to the drawings.

In the first embodiment described above, in step S2, the characteristic obtaining unit 163 obtains the drive characteristics of the electrostatic actuator 56 from the initial gap dimension of the gap G2. In contrast, the second embodiment is different from the first embodiment described above in that the drive characteristics of the electrostatic actuator 56 are obtained based on a plurality of measuring points.

In addition, in the following description, the same reference numerals are given to the configurations described above and the description thereof will be omitted or simplified.

Figure 7:
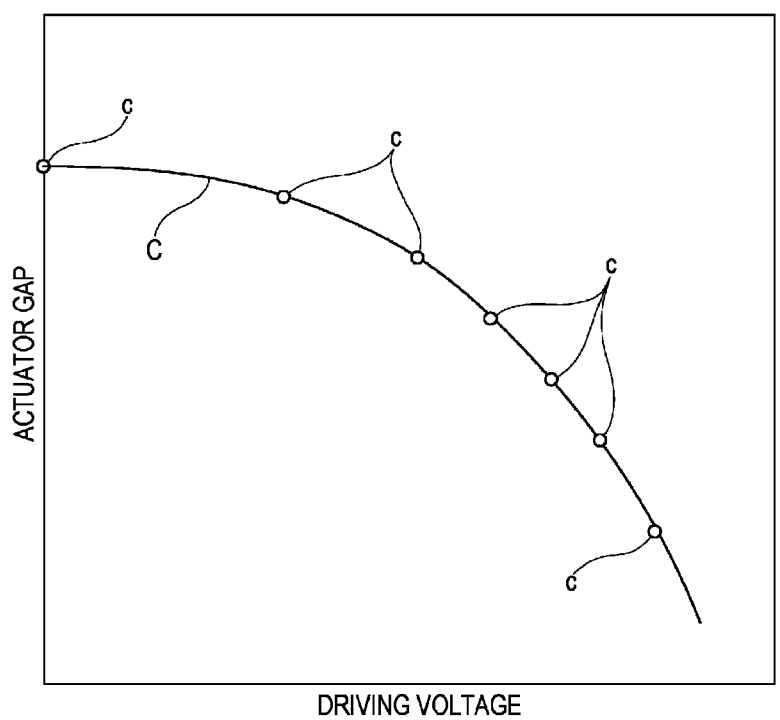
FIG. 7 is a diagram illustrating an obtaining method of drive characteristic data of a second embodiment.

FIG. 7 is a diagram illustrating an obtaining method of drive characteristic data of the second embodiment.

In the embodiment, a characteristic obtaining unit 163 obtains a plurality of dimensions (measuring points c) of a gap G2 by changing the drive voltage based on the detection signal from a gap detector when applying the drive voltage with respect to the drive voltage applied to an electrostatic actuator 56 in step S2 described above.

Then, the characteristic obtaining unit 163 obtains a curve data C of the drive characteristics, for example, by polynomial approximation and the like based on the obtained plurality of measuring points c.

In the embodiment, the drive characteristic data is obtained based on the plurality of measuring points c. In this case, for example, it is possible to measure the change in the drive characteristics based on many parameters such as the spring coefficient of a holding section 522 of a variable wavelength interference filter 5. It is possible to more accurately set the compressed gas in the feedback control of the electrostatic actuator 56 and to perform stable feedback control by obtaining the drive characteristic data corresponding to the change in many parameters.

Third Embodiment

Next, a third embodiment of the invention will be described with reference to the drawings.

In the first and the second embodiments described above, the optical module 10 that controls the gap G1 between the reflective films 54 and 55 to a desired value by using one electrostatic actuator 56 is exemplified.

In contrast, in the third embodiment, the electrostatic actuator includes a first actuator and a second actuator capable of respectively being independently driven, and the third embodiment is different from the first and second embodiments in that the dimension of the gap G1 is controlled by the first and second actuators.

Figure 8:
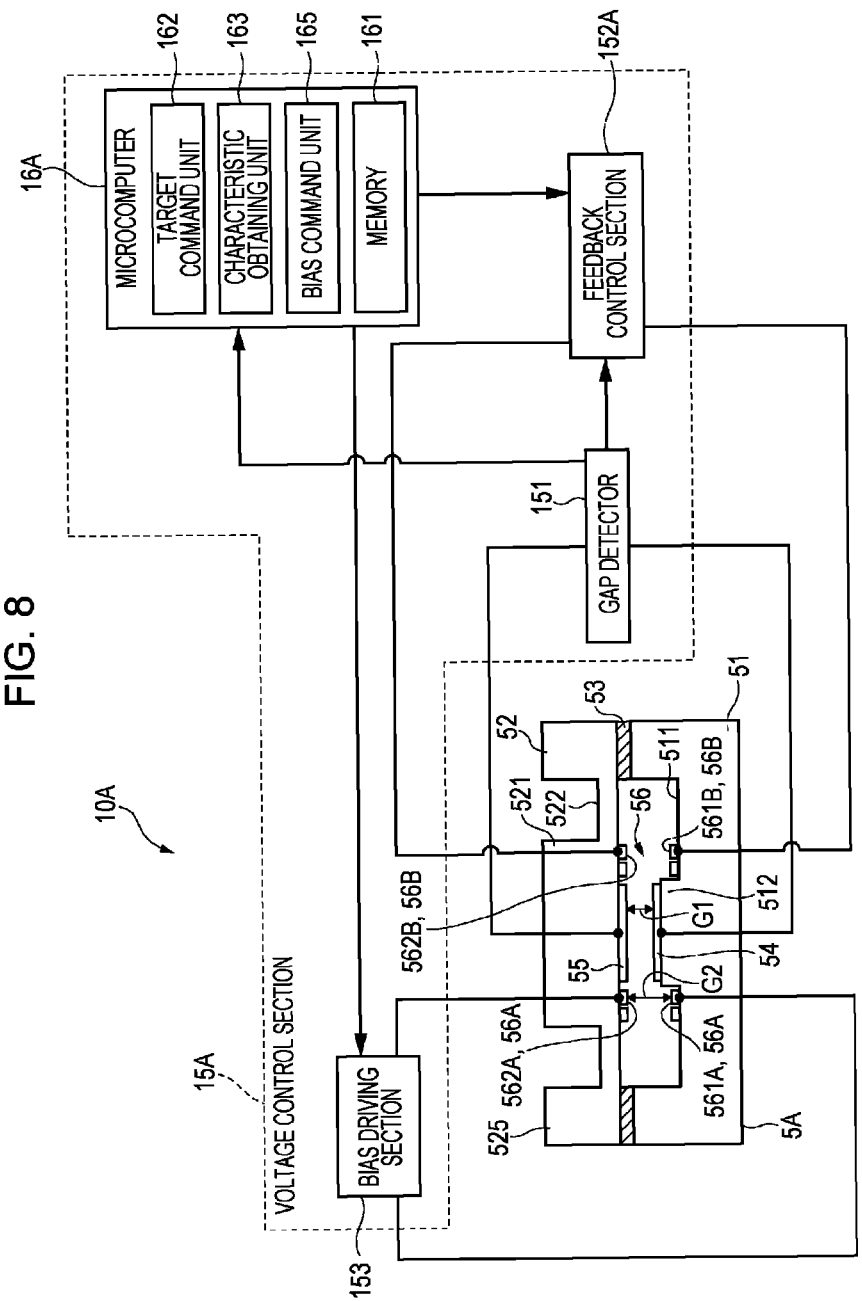
FIG. 8 is a diagram illustrating a schematic configuration of an optical module of a third embodiment.
Figure 9:
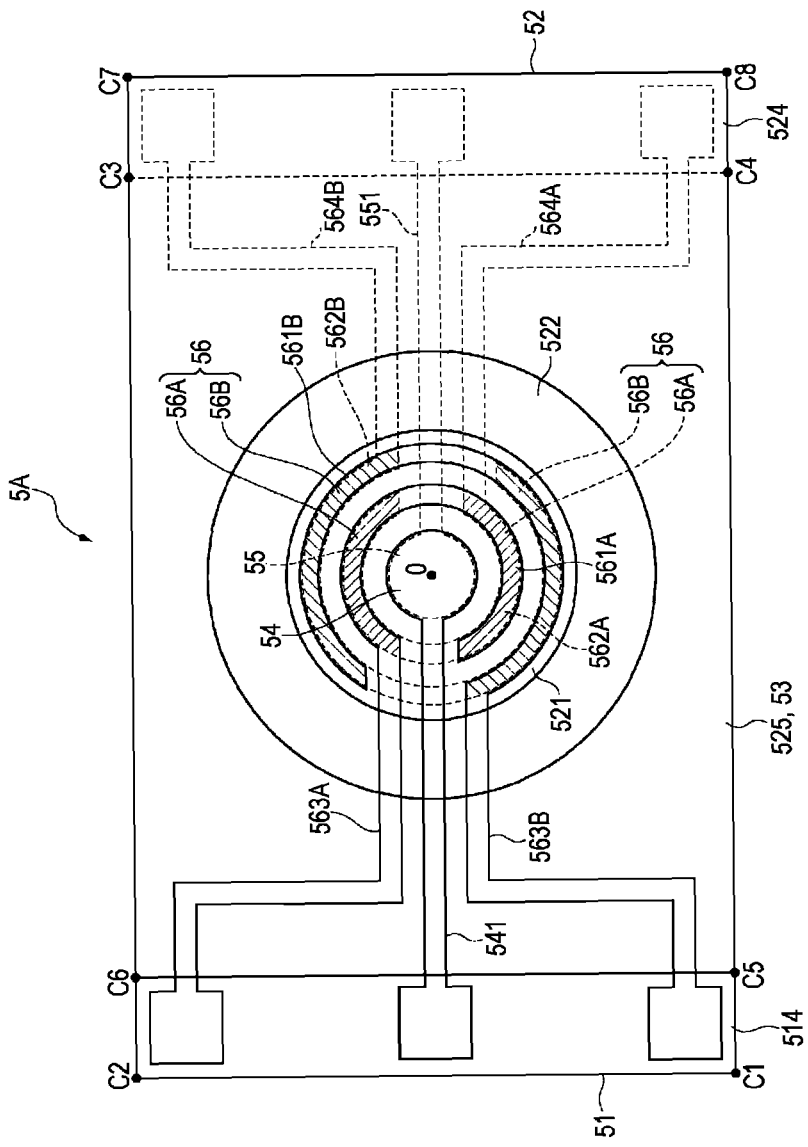
FIG. 9 is a plan view of a variable wavelength interference filter of the third embodiment.

FIG. 8 is a diagram illustrating a schematic configuration of an optical module of a third embodiment. FIG. 9 is a plan view of a variable wavelength interference filter.

Configuration of Variable Wavelength Interference Filter

A variable wavelength interference filter 5A of the embodiment is different from the first and second embodiments in a configuration of electrodes. The variable wavelength interference filter 5A of the embodiment is provided with the electrodes of double electrode structure on the outside of reflective films 54 and 55 in a plan view of a filter.

Specifically, as illustrated in FIGS. 8 and 9, an electrostatic actuator of the variable wavelength interference filter 5A of the embodiment is configured of a first electrostatic actuator 56A and a second electrostatic actuator 56B.

The first electrostatic actuator 56A is configured of a first fixed electrode 561A provided in a fixed substrate 51 and a first movable electrode 562A provided in a movable substrate 52.

A first fixed lead-out electrode 563A is connected to the first fixed electrode 561A, a first movable lead-out electrode 564A is connected to the first movable electrode 562A, and a voltage control section 15A is respectively connected to the lead-out electrodes 563A and 564A.

The second electrostatic actuator 56B is provided on the outside of the first electrostatic actuator 56A and is configured of a second fixed electrode 561B provided in the fixed substrate 51 and a second movable electrode 562B provided in the movable substrate 52.

A second fixed lead-out electrode 563B is connected to the second fixed electrode 561B, a second movable lead-out electrode 564B is connected to the second movable electrode 562B, and the voltage control section 15A is connected to the lead-out electrodes 563B and 564B, respectively.

Configuration of Voltage Control Section

Figure 10:
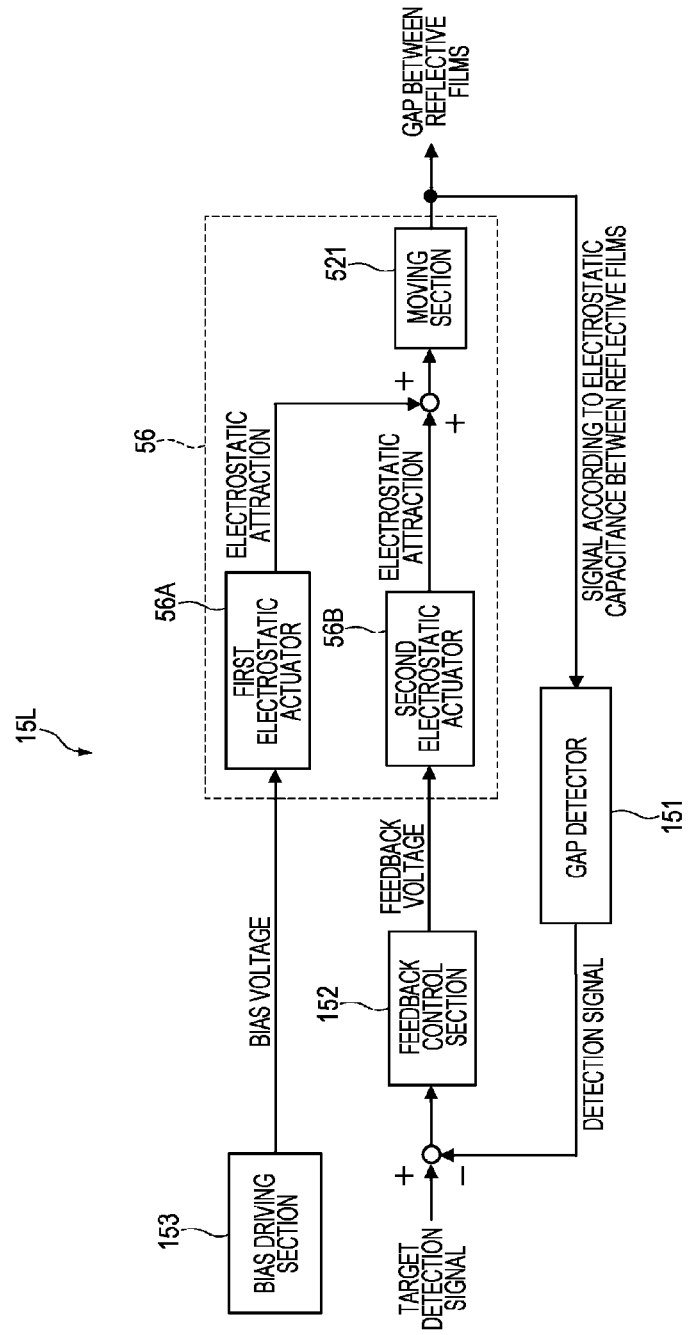
FIG. 10 is a conceptual diagram of a closed loop system in a voltage control section of the third embodiment.

FIG. 10 is a conceptual diagram of a feedback loop (closed loop system) of the embodiment.

The closed loop system 15L of the voltage control section 15A of the embodiment is further provided with a bias driving section 153 (bias voltage applying unit of the invention) with respect to the voltage control section 15 of the first embodiment.

Each of the lead-out electrodes 563A and 564A of the first electrostatic actuator 56A is connected to the bias driving section 153.

Furthermore, each of the lead-out electrodes 563B and 564B of the second electrostatic actuator 56B is connected to a feedback control section 152A.

The bias driving section 153 applies the bias voltage to the first electrostatic actuator 56A. Specifically, the bias driving section 153 applies the voltage to the first electrostatic actuator 56A based on the bias signal input from a microcomputer 16A.

The feedback control section 152 applies the feedback voltage to the second electrostatic actuator 56B. At this time, the feedback control section 152 applies the feedback voltage to the second electrostatic actuator 56B and thereby the detection signal input from the gap detector 151 is the same value as that of the target signal input from the microcomputer 16A.

Moreover, in the embodiment, the gain of the feedback control section 152 becomes the fixed gain and is constantly held.

The microcomputer 16A has a memory 161 and similar to the first embodiment, gap correlated data, drive characteristic data, and a setting gain corresponding to each drive characteristic data are recorded in the microcomputer 16A.

Furthermore, the microcomputer 16A functions as a target command unit 162, a characteristic obtaining unit 163, and a bias command unit 165.

The bias command unit 165 outputs a bias command instructing application of the bias voltage to the bias driving section 153 based on a wavelength setting command input from a control section 20.

Driving Method of Variable Wavelength Interference Filter

Figure 11:
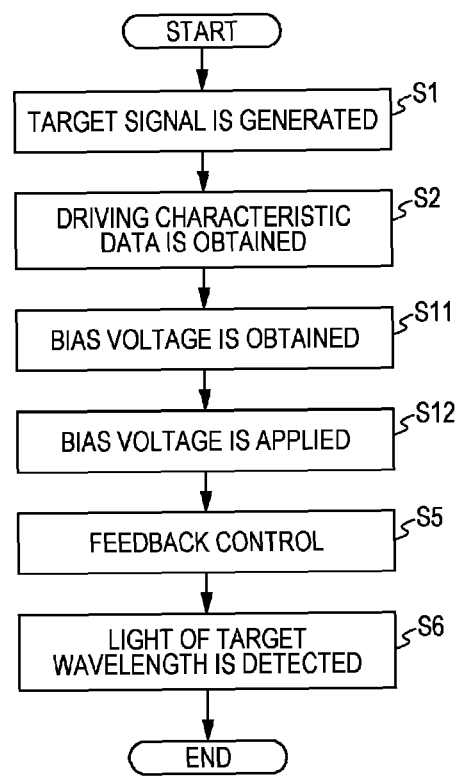
FIG. 11 is a flowchart illustrating a driving method (control method of an actuator) of the variable wavelength interference filter of the third embodiment.

FIG. 11 is a flowchart illustrating a driving method (control method of an actuator) of the variable wavelength interference filter.

In order to obtain the light intensity of each wavelength included in the measurement object light by the spectroscopic measurement apparatus 1, first, similar to the first embodiment, the wavelength setting command is output from the control section 20 to the voltage control section by the process of step S1. Furthermore, the microcomputer 16A calculates the target value (target signal) of the gap G1 correlated the target wavelength when receiving the wavelength setting command.

Thereafter, similar to step S2, the characteristic obtaining unit 163 obtains the detection signal input from the gap detector 151 in the initial state and obtains the initial gap dimension of the gap G1 between the reflective films 54 and 55. Moreover, similar to the second embodiment, the plurality of measuring points c are obtained and the drive characteristics may be obtained. In this case, the dimension of the gap G2 when applying the bias voltage from the bias driving section 153 is obtained and the dimension is to be the measuring point c.

Next, the bias command unit 165 obtains the optimal bias voltage depending on the obtained drive characteristic data (step S11).

Specifically, the bias command unit 165 calculates the bias voltage corresponding to the target value of the gap G1.

That is, in the embodiment, the bias voltage is set in the feedback control such that the sensitivity (gap displacement amount (m/V) with respect to the applied voltage) when applying the voltage to the second electrostatic actuator 56B is constant.

Here, sensitivity $R_c$ (m/V) when applying the voltage to the second electrostatic actuator 56B is represented by following Expression (1).

$$R_C = \frac{\{2k\varepsilon S_C d(d_{max} - d)^2 - \varepsilon^2 S_C S_b V_b^2\}^{1/2}}{k(d_{max} - d)(d_{max} - 3d)} \quad (1)$$

In Expression (1), $V_b$ is the bias voltage applying to the first electrostatic actuator 56A, k is the spring coefficient of the movable substrate 52 (the holding section 522), $\varepsilon$ is a dielectric constant between the fixed substrate and the movable substrate 52 (the gap G2 between the electrodes), $S_b$ is an effective area (an area of a region in which the first fixed electrode 561A and the first movable electrode 562A overlap in a plan diagram of the filter) of the first electrostatic actuator 56A, $S_c$ is an effective area of the second electrostatic actuator 56B, $d_{max}$ is the initial gap amount of the gap G2 between the electrodes, and d is the target displacement amount (gap displacement amount of the gap G2 between the electrodes) of the movable section 521 to transmit the light of the target wavelength.

In the embodiment, the bias voltage $V_b$ is applied in the feedback control such that the sensitivity when applying the voltage to the second electrostatic actuator 56B is constant. That is, in Expression (1), $V_c$ is a constant value and a value that is set in advance depending on the fixed gain in the colorimeter configuring the feedback control section 152A is used. Furthermore, when the wavelength setting command designating the target wavelength is input from the control section 20, the microcomputer 16A can calculate the target value of the gap G1 that is necessary for taking out the light of the target wavelength from the variable wavelength interference filter 5A and can calculate an amount (target displacement amount d) to displace the movable section 521 from the target value.

When solving for $V_b$ in Expression (1) described above, the following Expression (2) is derived.

$$V_b = \left[\frac{k}{\varepsilon S_b}\left\{2d(d_{max} - d)^2 - \frac{kR_c^2(d_{max} - d)^2(d_{max} - 3d)^2}{\varepsilon S_c}\right\}\right]^{1/2} \quad (2)$$

The bias command unit 165 calculates the bias voltage in which the sensitivity when applying the voltage to the second electrostatic actuator 56B is constant based on Expression (2) described above and outputs the bias command of indicating that the bias voltage is applied to the first electrostatic actuator 56A to the bias driving section 153. Thus, the bias voltage is applied from the bias driving section 153 to the first electrostatic actuator 56A (step S12).

That is, in the embodiment, the gain of the feedback control section 152 is fixed and the optimal bias voltage is set depending on the drive characteristics of the electrostatic actuator 56 by the bias command unit 165 and thereby the sensitivity when applying the voltage to the second electrostatic actuator 56B is adjusted and the gain is optimized in an entirety of the closed loop system 15L. Thus, in the embodiment, the bias command unit 165 functions as the gain setting unit in the invention.

Thereafter, the feedback control of step S5 and obtaining of the light amount of step S6 are performed.

In the embodiment, the electrostatic actuator 56 is configured of the first electrostatic actuator 56A to which the voltage is applied by the bias driving section 153 and the second electrostatic actuator 56B to which the feedback voltage is applied by the feedback control section 152A. Then, the bias command unit 165 resets the bias voltage in the bias driving section 153 based on the drive characteristics of the electrostatic actuator 56 obtained by the characteristic obtaining unit 163.

Thus, also in the embodiment, similar to the embodiments described above, even if the drive characteristics of the actuator are varied, the gain can be controlled in the entirety of the closed loop system 15L such that the bias voltage of the bias driving section is set to the optimal value depending on the varied characteristics and the sensitivity in the feedback control is constant by the second electrostatic actuator 56B. Thus, it is possible to perform the optimal feedback control.

Other Embodiments

Moreover, the invention is not limited to the embodiments and deformation, improvement, and the like are intended to be included in the invention in a range in which the object of the invention can be achieved.

For example, in the invention, as the actuator, the electrostatic actuator that changes the dimension of the gap G1 in the variable wavelength interference filters 5 and 5A is exemplified, but the invention is not limited to the embodiments. For example, a feedback loop using another actuator such as a piezoelectric actuator and a dielectric coil actuator as the actuator may be the object. Specifically, in a case of an actuator in which the drive amount is non-linearly varied with respect to the detection voltage, if the optimal gain is not set in the feedback control, as described above, there is a concern that normal drive is hindered, such as by abnormal oscillation. The invention is effective in the actuator in which the drive characteristics are non-linearly varied and can perform the feedback control in which the optimal control state is maintained by setting the optimal gain.

In the embodiments described above, the reflective films 54 and 55 are utilized as the electrodes for capacitance detection, but the configuration is not limited to the embodiment. For example, electrodes for capacitance detection facing each other may be printed in the fixed substrate 51 and the movable substrate 52 separately from the reflective films 54 and 55.

Furthermore, the reflective films 54 and 55 may be used as the driving electrodes. For example, in the third embodiment, the reflective films 54 and 55 may function as the second electrostatic actuator or the first electrostatic actuator.

Furthermore, the detection unit of the drive amount is not limited to the configuration using the electrostatic capacitance detection electrode described above and, for example, may be configured to detect the gap amount of the gap G1 between the reflective films by detecting a curved state of the movable substrate 52 (the holding section 522) by a strain gauge and the like or may be configured to provide an optical sensor for detecting the gap amount on the outside.

Furthermore, in each embodiment described above, the bias voltage applied to the bias driving section 153 is set based on Expression (2), but the configuration is not limited to the embodiments. For example, a configuration may be provided in which the bias voltage with respect to the target value of the gap G1 between the reflective films 54 and 55 is stored in the table data and is stored in a storage unit. In this case, the microcomputer 16 may read the bias voltage with respect to the target gap amount from the table data without performing the calculation of the bias voltage based on Expression (2).

Furthermore, as the bias voltage, a voltage smaller than the drive voltage to set the gap G1 between the reflective films to the target gap amount may be used by independently driving the bias driving section 153. It is possible to reduce the sensitivity and to improve the accuracy of the feedback control by applying such a bias voltage compared to a case where the bias voltage is not applied in the control of the second electrostatic actuator 56B by the feedback control section 152.

In the third embodiment described above, an example in which the first electrostatic actuator 56A to which the bias voltage is applied is disposed on the outer periphery side of the second electrostatic actuator 56B to which the feedback voltage is applied is illustrated, but the invention is not limited to the embodiment. For example, a configuration may be provided in which the first electrostatic actuator 56A is provided on an inner periphery side of the second electrostatic actuator 56B and the second electrostatic actuator 56B is provided on the outer periphery side of the first electrostatic actuator 56A on the outer periphery side of the reflective films 54 and 55.

Furthermore, as the electronic apparatus of the invention, in each embodiment described above, the spectroscopic measurement apparatus 1 is exemplified, but in addition, it is possible to apply the driving method of the variable wavelength interference filter, the optical module, and the electronic apparatus of the invention to various fields.

Figure 12:
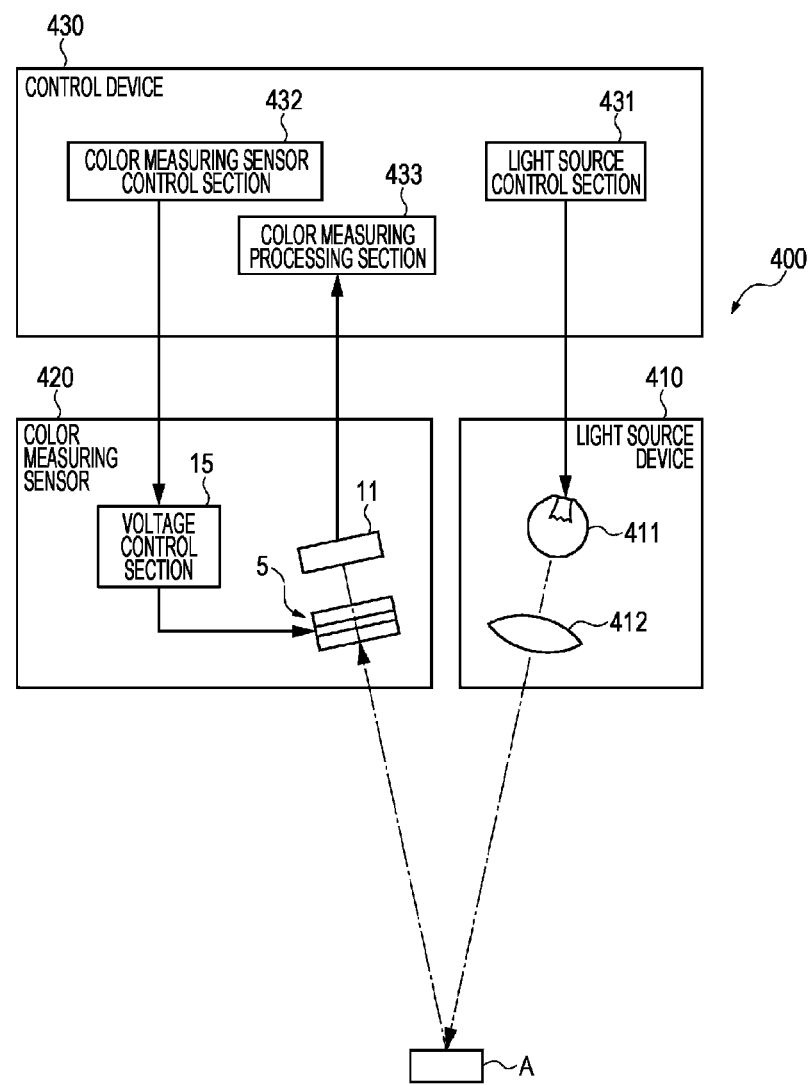
FIG. 12 is a schematic diagram illustrating a color measuring apparatus that is an example of an electronic apparatus of the invention.

For example, as illustrated in FIG. 12, the electronic apparatus of the invention can be applied to a color measuring apparatus for measuring color.

FIG. 12 is a block diagram illustrating a color measuring apparatus 400 including a variable wavelength interference filter.

As illustrated in FIG. 12, a color measuring apparatus 400 includes a light source device 410 emitting light to an inspection object A, a color measuring sensor 420 (optical module), and a control device 430 (processing section) that controls an entire operation of the color measuring apparatus 400. Then, the color measuring apparatus 400 is a device that reflects light reflected from the light source device 410 on the inspection object A, receives the reflected inspection object light in the color measuring sensor 420, and analyzes and measures chromaticity of the inspection object light, that is, the color of the inspection object A based on the detection signal output from the color measuring sensor 420.

The light source device 410 includes a light source 411 and a plurality of lenses 412 (only one is described in FIG. 12), and emits a reference light (for example, white light) with respect to the inspection object A. Furthermore, the plurality of lenses 412 may include a collimator lens and, in this case, the light source device 410 makes the reference light emitted from the light source 411 be parallel light by the collimator lens and emits the parallel light from a projection lens (not illustrated) to the inspection object A. Moreover, in the embodiment, the color measuring apparatus 400 including the light source device 410 is exemplified, but, for example, if the inspection object A is a light emitting member such as a liquid crystal panel, the light source device 410 may not be provided.

As illustrated in FIG. 12, the color measuring sensor 420 includes a variable wavelength interference filter 5, a detector 11 that receives the light transmitting the variable wavelength interference filter 5, and a voltage control section 15 that varies the wavelength of the light transmitting the variable wavelength interference filter 5. Furthermore, the color measuring sensor 420 includes an incident optical lens (not illustrated) that guides the reflected light (the inspection object light) reflected on the inspection object A to the inside in a position facing the variable wavelength interference filter 5. Then, the color measuring sensor 420 spectrally disperses the light of a predetermined wavelength of the inspection object light incident from the incident optical lens and receives the spectroscopic light in the detector 11 by the variable wavelength interference filter 5. Moreover, a variable wavelength interference filter 5A may be provided instead of the variable wavelength interference filter 5.

The control device 430 controls an entire operation of the color measuring apparatus 400.

As the control device 430, for example, a general-purpose personal computer, a portable information terminal, a dedicated color measuring computer, or the like may be used. Then, as illustrated in FIG. 12, the control device 430 is configured by including a light source control section 431, a color measuring sensor control section 432, a color measuring processing section 433, and the like.

The light source control section 431 is connected to the light source device 410, outputs a predetermined control signal to the light source device 410, for example, based on a setting input of a user, and emits white light of predetermined brightness.

The color measuring sensor control section 432 is connected to the color measuring sensor 420 and sets the wavelength of the light received by the color measuring sensor 420, for example, based on the setting input of the user, and outputs the control signal of indicating that a received light amount of the wavelength is detected to the color measuring sensor 420. Thus, the voltage control section 15 of the color measuring sensor 420 applies the voltage to the electrostatic actuator 56 based on the control signal and drives the variable wavelength interference filter 5.

The color measuring processing section 433 analyzes chromaticity of the inspection object A from the received light amount detected by the detector 11.

Furthermore, as another example of the electronic apparatus of the invention, a light-based system for detecting a presence of a specific substance is included. As such a system, for example, a gas leak detector mounted on a vehicle for high sensitively detecting a specific gas or a gas detection apparatus such as a photoacoustic noble gas for a breath test by employing a spectroscopic measurement method using the variable wavelength interference filter of the invention can be exemplified.

An example of such a gas detection apparatus will be described below with reference to the drawings.

Figure 13:
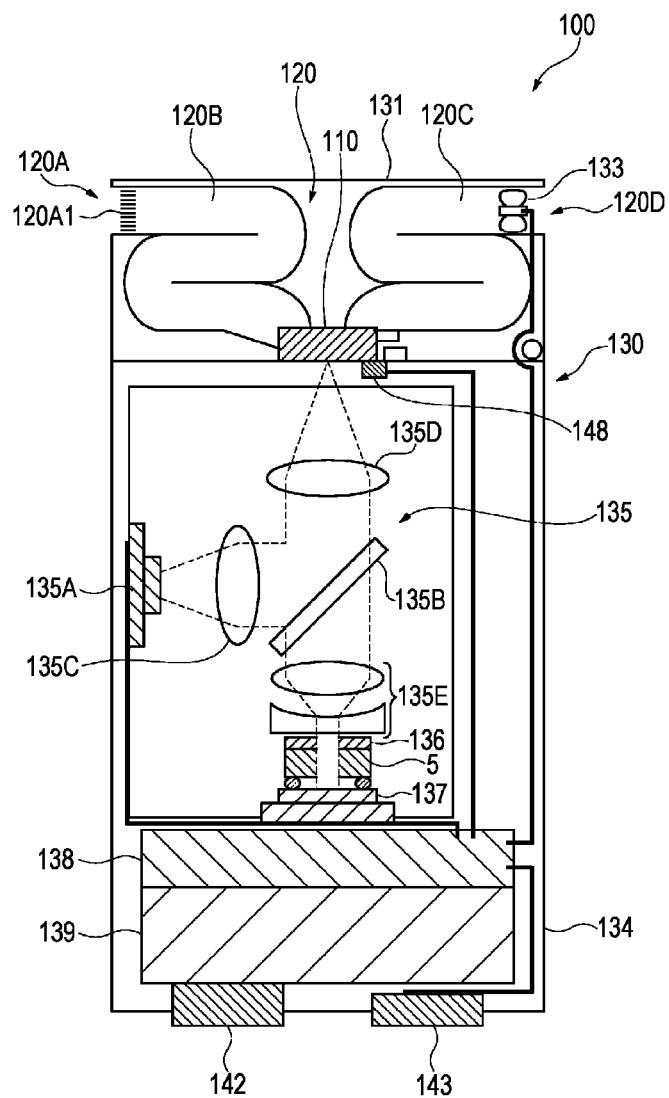
FIG. 13 is a schematic view illustrating a gas detecting apparatus that is an example of the electronic apparatus of the invention.

FIG. 13 is a schematic view illustrating a gas detection apparatus that is an example of the electronic apparatus of the invention.

Figure 14:
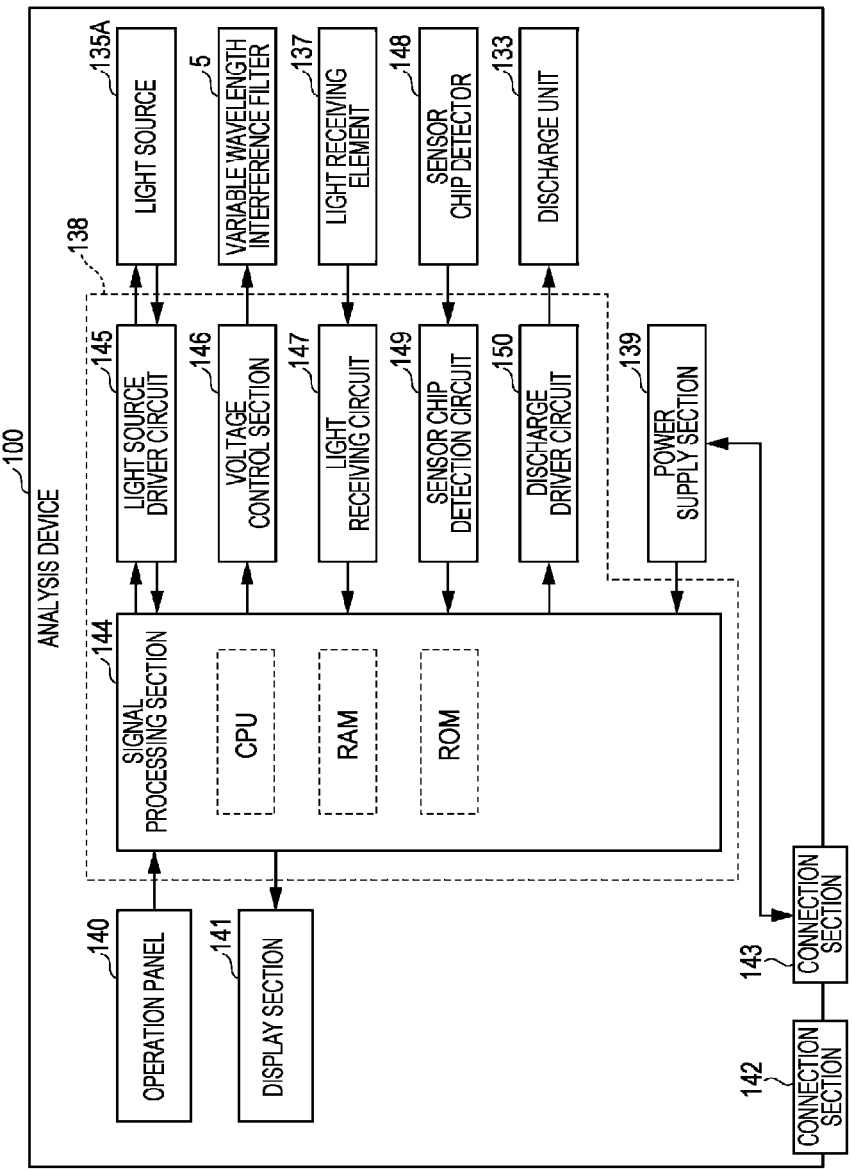
FIG. 14 is a block diagram illustrating a configuration of a control system of the gas detecting apparatus of FIG. 13.

FIG. 14 is a block diagram illustrating a configuration of a control system of the gas detecting apparatus of FIG. 13.

As illustrated in FIG. 13, a gas detecting apparatus 100 is configured by including a flow passage 120 that has a sensor chip 110, an intake port 120A, an intake flow passage 120B, a discharge flow passage 120C, and a discharge port 120D, and a body section 130.

The body section 130 is configured of a detection device (optical module) that includes a sensor section cover 131 having an opening capable of attaching and detaching the flow passage 120, a discharge unit 133, a housing 134, an optical section 135, a filter 136, a variable wavelength interference filter 5, a light receiving element 137 (detection section), and the like, a control section 138 (processing section) that processes a detected signal and controls the detection section, a power supply section 139 that supplies power, and the like. Furthermore, the opening section 135 is configured of a light source 135A that emits light, a beam splitter 135B that reflects the light incident from the light source 135A to the sensor chip 110 side and transmits the light incident from the sensor chip side to the light receiving element 137, and lenses 135C, 135D, and 135E.

Furthermore, as illustrated in FIG. 14, an operation panel 140, a display section 141, a connection section 142 for the interface with the outside, and the power supply section 139 are provided on a surface of the gas detecting apparatus 100. If the power supply section 139 is a secondary battery, a connection section 143 for charging may not be included.

Furthermore, as illustrated in FIG. 14, the control section 138 of the gas detecting apparatus 100 includes a signal processing section 144 that is configured of a CPU and the like, a light source driver circuit 145 that controls the light source 135A, a voltage control section 146 that controls the variable wavelength interference filter 5, a light receiving circuit 147 that receives a signal from the light receiving element 137, a sensor chip detection circuit 149 that reads a code of the sensor chip 110 and receives the signal from a sensor chip detector 148 detecting presence or absence of the sensor chip 110, and a discharge driver circuit 150 that controls the discharge unit 133.

Next, an operation of the gas detecting apparatus 100 described above will be described below.

The sensor chip detector 148 is provided inside the sensor section cover 131 on the upper portion of the body section 130 and the sensor chip detector 148 detects presence or absence of the sensor chip 110. When detecting the detection signal from the sensor chip detector 148, the signal processing section 144 determines that the sensor chip 110 is in a mounted state and outputs a display signal displaying indicating that a detection operation is capable of performing to the display section 141.

Thus, for example, if the operation panel 140 is operated by a user and an instruction signal of indicating that a detection process is started is output from the operation panel 140 to the signal processing section 144, first, the signal processing section 144 outputs a signal of a light source operation to the light source diver circuit 145 and operates the light source 135A. If the light source 135A is driven, stable laser beam of linearly polarized light having a single wavelength is emitted from the light source 135A. Furthermore, a temperature sensor or a light amount sensor are built in the light source 135A and information thereof is output to the signal processing section 144. Then, if it is determined that the light source 135A is stably operated based on the temperature or the light amount input from the light source 135A, the signal processing section 144 controls the discharge driver circuit 150 and operates the discharge unit 133. Thus, a gas sample containing a target material (gas molecule) to be detected is guided from the intake port 120A to the intake flow passage 120B, inside the sensor chip 110, the discharge flow passage 120C, and the discharge port 120D. Moreover, the intake port 120A is provided with a dust filter 120A1 and removes a relatively large amount of dust or some of water vapor, and the like.

Furthermore, the sensor chip 110 is a sensor in which a plurality of metal nanostructures are embedded and which uses localized surface plasmon resonance. In such a sensor chip 110, if an enhanced electric field is formed between the metal nanostructures by the laser beam and the gas molecule enters the enhanced electric field, a Raman scattering light and a Rayleigh scattering light containing information of molecular vibration are generated.

The Raman scattering light or the Rayleigh scattering light is incident on the filter 136 through the optical section 135, the Rayleigh scattering light is separated by the filter 136, and the Raman scattering light is incident on the variable wavelength interference filter 5. Then, the signal processing section 144 outputs the control signal to the voltage control section 146. Thus, as illustrated in the first embodiment described above, the voltage control section 146 is configured of a gap detector 151, a feedback control section 152, and a microcomputer 16, drives the variable wavelength interference filter 5 by the same driving method as that of the first embodiment, and spectrally disperses the Raman scattering light corresponding to the gas molecule that is the detection object by the variable wavelength interference filter 5. Moreover, the configuration may be the same as that of the voltage control section 15A of the third embodiment.

Thereafter, when receiving the spectroscopic light in the light receiving element 137, a light receiving signal depending on the received light amount is output to the signal processing section 144 through the light receiving circuit 147. In this case, it is possible to accurately take out the Raman scattering light that is the object from the variable wavelength interference filter 5.

The signal processing section 144 compares spectral data of the Raman scattering light corresponding to the gas molecule to be detected obtained as described above and data stored in a ROM, determines whether or not the gas molecule is the target gas molecule, and makes the gas molecule a specific substance. Furthermore, the signal processing section 144 displays result information on the display section 141 or outputs the information from the connection section 142 to the outside.

In addition, in FIGS. 13 and 14, the gas detecting apparatus 100 that spectrally disperses the Raman scattering light by the variable wavelength interference filter 5 and performs the gas detection from the spectral Raman scattering light is exemplified, but as the gas detecting apparatus, a gas detecting apparatus for identifying a type of gas by detecting gas-specified absorption may be used. In this case, a gas sensor that makes gas enter the sensor and detects light of the incident light, which is absorbed in the gas, is used as the optical module of the invention. Then, the gas detecting apparatus that analyzes and determines the gas entering the sensor by the gas sensor is the electronic apparatus of the invention. It is possible to detect components of the gas by using the variable wavelength interference filter even in such a configuration.

Furthermore, as the system for detecting the presence of a specific substance, the system is not limited to the gap detection described above and a substance component analysis apparatus such as a non-invasive measuring apparatus of sugars by near infrared spectroscopy or a non-invasive measurement apparatus of information of food or organisms, minerals, and the like can be exemplified.

Hereinafter, as an example of the substance component analysis apparatus, a food analysis apparatus is described.

Figure 15:
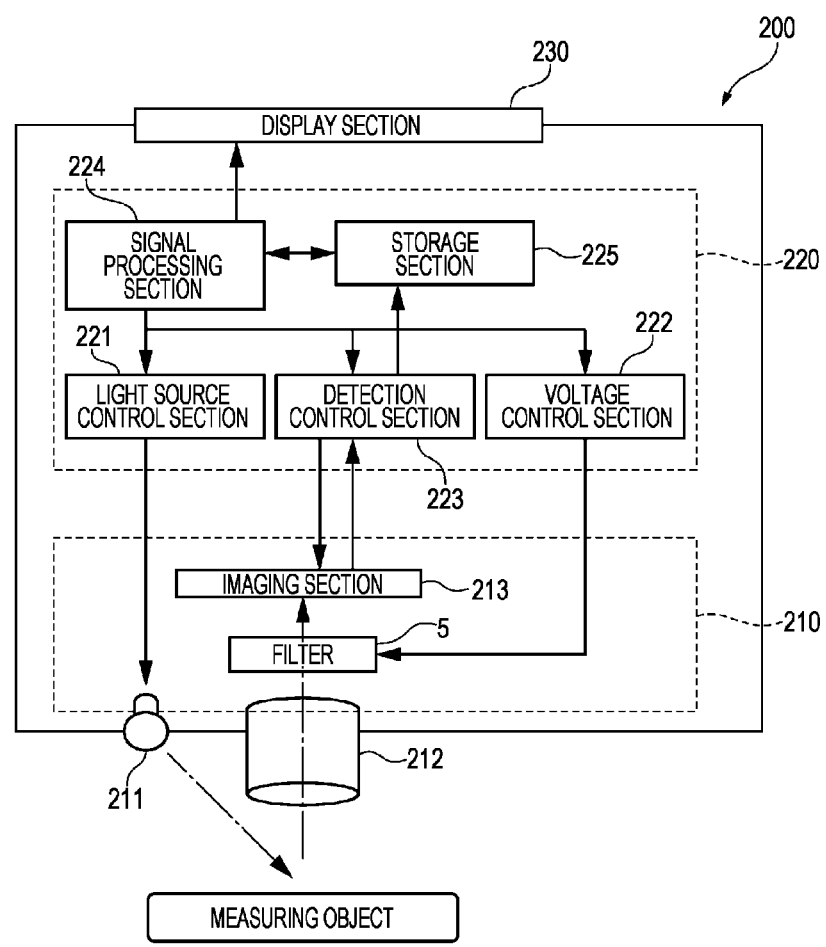
FIG. 15 is a diagram illustrating a schematic configuration of a food analysis apparatus that is an example of the electronic apparatus of the invention.

FIG. 15 is a diagram illustrating a schematic configuration of a food analysis apparatus that is an example of the electronic apparatus using the variable wavelength interference filter 5.

As illustrated in FIG. 15, a food analysis apparatus 200 includes a detector 210 (optical module), a control section 220, and a display section 230. The detector 210 includes a light source 211 that emits light, an imaging lens 212 that introduces the light from a measurement object, a variable wavelength interference filter 5 that spectrally disperses the light introduced from the imaging lens 212, and an imaging section 213 (detection section) that detects the spectroscopic light.

Furthermore, the control section 220 includes a light source control section 221 that performs control of lighting and lighting off of the light source 211 and brightness when lighting, a voltage control section 222 that controls the variable wavelength interference filter 5, a detection control section 223 that controls the imaging section 213 and obtains spectroscopic image photographed in the imaging section 213, a signal processing section 224 (analyzing section), and a storage section 225.

In the food analysis apparatus 200, when the system is driven, the light source 211 is controlled by the light source control section 221 and the light is irradiated from the light source 211 to a measurement object. Then, the light reflected on the measurement object is incident on the variable wavelength interference filter 5 through the imaging lens 212. The variable wavelength interference filter 5 is driven by the control of the voltage control section 222 with the driving method as illustrated in the first embodiment described above. Thus, it is possible to accurately take out the light of the target wavelength from the variable wavelength interference filter 5. Then, the take-out light is, for example, photographed by the imaging section 213 configured of a CCD camera and the like. Furthermore, the imaged light is accumulated in the storage section 225 as the spectroscopic image. Furthermore, the signal processing section 224 controls the voltage control section 222, changes a voltage value applied to the variable wavelength interference filter 5, and obtains the spectroscopic image for each wavelength.

Then, the signal processing section 224 calculates data of each pixel in each image accumulated in the storage section 225 and obtains a spectrum in each pixel. Furthermore, the storage section 225 stores information about a food ingredient with respect to the spectrum. The signal processing section 224 analyzes data of the obtained spectrum based on the information about the food stored in the storage section 225 and obtains the food ingredient and its content amount contained in a detection object. Furthermore, it is also possible to calculate calories and freshness of the food from the obtained food ingredient and content amount. Furthermore, it is possible to perform extraction and the like of a portion in which freshness of the food of the inspection object is lowered by analyzing spectrum distribution in the image.

Then, the signal processing section 224 performs a process to display on the display section 230 information of the food ingredient or content amount, calories, or freshness and the like of the food that is the inspection object obtained as described above.

Furthermore, in FIG. 15, the food analysis apparatus 200 is exemplified, but can also be used as a non-invasive measurement apparatus of other information as described above by substantially the same configuration. For example, it is possible to use a biological analysis apparatus that analyzes a biological component such as measurement, analysis, and the like of a biological component such as blood. For example, such a biological analysis apparatus can be used as a drunken driving prevention apparatus for detecting a drinking level of a driver if the apparatus is an apparatus for detecting ethyl alcohol as an apparatus measuring a fluid component of the blood and the like. Furthermore, it is also possible to be used as an electronic endoscope system including such a biological analysis apparatus.

Furthermore, it is also possible to be used as a mineral analysis apparatus for performing component analysis of the minerals.

Furthermore, the variable wavelength interference filter, the optical module, and the electronic apparatus of the invention can be applied to the following apparatuses.

For example, data can be transmitted by the light of each wavelength by varying light intensity of each wavelength with time. In this case, the light of a specific wavelength is spectrally dispersed by the variable wavelength interference filter provided in the optical module and the light receiving section receives the light, and thereby it is possible to extract the data transmitted by the light of the specific wavelength. The data of each wavelength is printed by the electronic apparatus including such an optical module for extracting the data and thereby it is also possible to perform optical communication.

Furthermore, the electronic apparatus can be applied to a spectroscopic camera photographing the spectroscopic image, a spectroscopic analyzer, and the like by spectrally dispersing the light by the variable wavelength interference filter of the invention. As an example of the spectroscopic camera, an infrared camera equipped with the variable wavelength interference filter is included.

Figure 16:
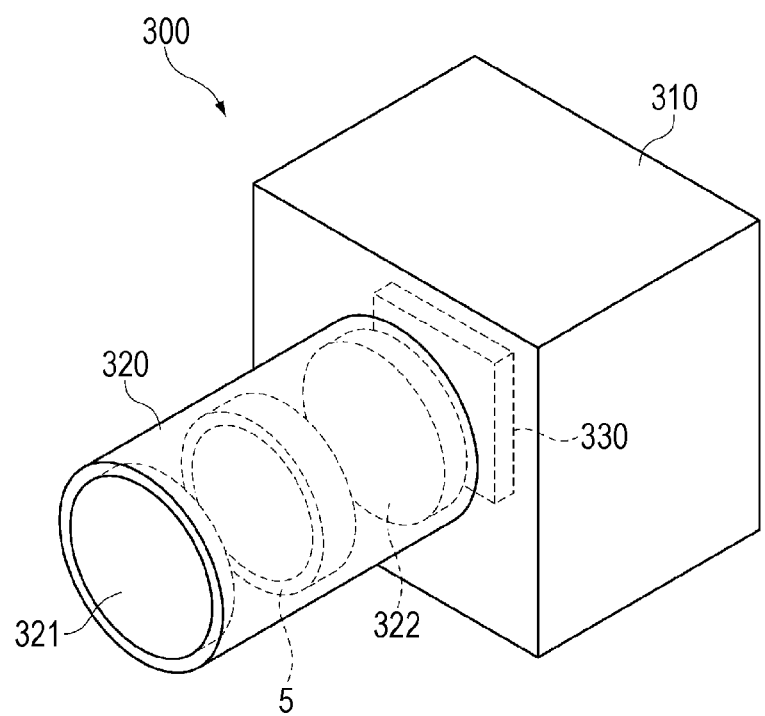
FIG. 16 is a diagram illustrating a schematic configuration of a spectroscopic camera that is an example of the electronic apparatus of the invention.

FIG. 16 is a diagram illustrating a schematic configuration of the spectroscopic camera. As illustrated in FIG. 16, a spectroscopic camera 300 includes a camera body 310, an imaging lens unit 320, and an imaging section 330 (detection section).

The camera body 310 is a portion that is held and operated by a user.

The imaging lens unit 320 is provided in the camera body 310 and guides an incident image light to the imaging section 330. Furthermore, as illustrated in FIG. 16, the imaging lens unit 320 is configured by including an objective lens 321, an imaging lens 322, and a variable wavelength interference filter 5 provided between the lenses.

The imaging section 330 is configured of a light emitting element and photographs the image light guided by the imaging lens unit 320.

In such a spectroscopic camera 300, the light of a wavelength that is the imaging object is transmitted by the variable wavelength interference filter 5 and thereby it is possible to photograph the spectroscopic image of the light of a predetermined wavelength. At this time, a voltage control section (not illustrated) drives the variable wavelength interference filter 5 by the driving method of the invention as illustrated in the first embodiment described above for each wavelength and thereby it is possible to accurately take out the image light of the spectroscopic image of the target wavelength.

Furthermore, the variable wavelength interference filter of the invention may be used as a band pulse filter and, for example, can be used as an optical laser apparatus that spectrally disperses and transmits only the light of a narrow band centered on a predetermined wavelength of the light of a predetermined wavelength range that is emitted by the light emitting element.

Furthermore, the variable wavelength interference filter of the invention may be used as a biometric authentication apparatus and, for example, can be applied to an authentication apparatus of a blood vessel or a fingerprint, retina, iris, and the like using the light of a near infrared region or a visible region.

Furthermore, the optical module and the electronic apparatus can be used as a concentration detection apparatus. In this case, infrared energy (infrared light) emitted from a substance is spectrally dispersed and analyzed by the variable wavelength interference filter and measures a concentration of an analyte in a sample.

As described above, the variable wavelength interference filter, the optical module, and the electronic apparatus of the invention can be applied to any apparatus that spectrally disperses a predetermined light from the incident light. Then, as described above, since the variable wavelength interference filter of the invention can spectrally disperse a plurality of wavelengths in one device, it is possible to accurately perform the measurement of the spectrum of the plurality of wavelengths and inspection with respect to a plurality of components. Thus, it is possible to facilitate reduction of the a size of the optical module or the electronic apparatus compared to an apparatus of the related art in which a desired wavelength is taken out by a plurality of devices and, for example, it is possible for the optical module or the electronic apparatus to be appropriately used as an optical device for portable or vehicle.

Furthermore, in the embodiments described above, examples in which the drive characteristics are obtained from the gap dimension of the electrostatic actuator 56 provided between the substrates and the gain is set in the feedback control of the electrostatic actuator 56 are described, but the invention is not limited to the examples.

For example, feedback control of an actuator driving apparatus in which a drive amount is nonlinearly changed with respect to a drive voltage by applying a voltage can be used. For example, as such an actuator, a piezo actuator is included. Specifically, it is also possible to apply the voltage to a mirror device or the like for changing a posture of a mirror only by an angle depending on a drive voltage by applying the drive voltage to the piezo actuator. In this case, a configuration and the like in which drive characteristics of the piezo actuator are obtained by detecting a drive amount (driving angle and the like) of the piezo actuator when applying a predetermined drive voltage and the feedback control of the drive of the piezo actuator is performed based on the obtained drive characteristics is included.

In addition, the specific structure when implementing the invention can be appropriately changed to other structures in a range that can achieve the object of the invention.

The entire disclosure of Japanese Patent Application No. 2014-012125 filed on Jan. 27, 2014 is expressly incorporated by reference herein.

What is claimed is:

1. An actuator control device that controls an actuator comprising:
   a detection unit that detects a gap length between a first mirror of a variable wavelength interference filter and a second mirror of the variable wavelength interference filter, the gap length changing by applying a drive voltage between a first electrode of the variable wavelength interference filter and a second electrode of the variable wavelength interference filter;
   a feedback control section that controls the drive voltage applied between the first electrode and the second electrode depending on the gap length detected by the detection unit; and
   a gain setting unit that sets a gain in the feedback loop depending on drive characteristics of the first electrode and the second electrode based on the gap length detected by the detection unit, the gain controlling the drive voltage.

2. The actuator control device according to claim 1, wherein the gain setting unit sets the gain based on the drive amount in an initial state in which the drive voltage is not applied to the actuator.

3. The actuator control device according to claim 1, wherein the gain setting unit obtains a plurality of combinations of the drive voltage applied to the actuator and the drive amount detected by the detection unit when applying the drive voltage and sets the gain based on the combinations.

4. The actuator control device according to claim 1, wherein the feedback control section has a controller that controls the drive voltage applied to the actuator based on the drive amount detected by the detection unit and a target value of the drive amount of the actuator, and wherein the gain setting unit sets the gain of the controller.

5. The actuator control device according to claim 1, wherein the actuator has a first actuator and a second actuator capable of respectively being independently driven,
   wherein the feedback control section includes a bias voltage applying unit that applies a predetermined bias voltage to the first actuator and a controller that controls the drive voltage applied to the second actuator based on the drive amount detected by the detection unit and the target value of the drive amount of the actuator, and wherein the gain setting unit sets a bias voltage in the bias voltage applying unit.

6. An optical module comprising the actuator control device according to claim 1.

7. An electronic apparatus comprising:
an actuator control device according to claim 1, and
a processing section that performs a predetermined process by driving of the actuator.

8. The actuator control device according to claim 1, further comprising:
a first member; and
a second member facing the first member,
wherein the actuator is an electrostatic actuator including the first electrode provided in the first member and the second electrode provided in the second member and facing the first electrode, and
wherein the detection unit detects a gap dimension between the first member and the second member as the drive amount.

9. The actuator control device according to claim 1, further comprising:
a gain setting unit that sets a gain according to the characteristics of the gap length,
the gain controlling the drive voltage.

10. An actuator control device that controls an actuator comprising:
a detection unit that detects a gap length between a first mirror of a variable wavelength interference filter and a second mirror of the variable wavelength interference filter, the gap length changing by applying a drive voltage between a first electrode of the variable wavelength interference filter and a second electrode of the variable wavelength interference filter;
a feedback control section that controls the drive voltage applied between the first electrode and the second electrode depending on the gap length detected by the detection unit; and
a gain setting unit that sets a gain in the feedback loop depending on drive characteristics of the first electrode and the second electrode based on the gap length detected by the detection unit, the gain controlling the drive voltage,
wherein the gain setting unit sets the gain based on the drive amount in an initial state in which the drive voltage is not applied to the actuator.

11. The actuator control device according to claim 10, further comprising:
a first member; and
a second member facing the first member,
wherein the actuator is an electrostatic actuator including the first electrode provided in the first member and the second electrode provided in the second member and facing the first electrode, and
wherein the detection unit detects a gap dimension between the first member and the second member as the drive amount.

12. The actuator control device according to claim 10,
wherein the gain setting unit obtains a plurality of combinations of the drive voltage applied to the actuator and the drive amount detected by the detection unit when applying the drive voltage and sets the gain based on the combinations.

13. The actuator control device according to claim 10,
wherein the feedback control section has a controller that controls the drive voltage applied to the actuator based on the drive amount detected by the detection unit and a target value of the drive amount of the actuator, and
wherein the gain setting unit sets the gain of the controller.

14. The actuator control device according to claim 10,
wherein the actuator has a first actuator and a second actuator capable of respectively being independently driven,
wherein the feedback control section includes a bias voltage applying unit that applies a predetermined bias voltage to the first actuator and a controller that controls the drive voltage applied to the second actuator based on the drive amount detected by the detection unit and the target value of the drive amount of the actuator, and
wherein the gain setting unit sets a bias voltage in the bias voltage applying unit.

15. An optical module comprising the actuator control device according to claim 10.

16. An electronic apparatus comprising:
an actuator control device according to claim 10, and
a processing section that performs a predetermined process by driving of the actuator.

17. The actuator control device according to claim 10, further comprising:
a gain setting unit that sets a gain according to the characteristics of the gap length,
the gain controlling the drive voltage.

* * * * *